(12) United States Patent
Nishi et al.

(10) Patent No.: US 6,819,715 B2
(45) Date of Patent: Nov. 16, 2004

(54) IMAGE DECODING METHOD, IMAGE DECODING APPARATUS, AND DATA STORAGE MEDIUM

(75) Inventors: Takahiro Nishi, Osaka (JP); Shintarou Nakatani, Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 672 days.

(21) Appl. No.: 09/910,906

(22) Filed: Jul. 24, 2001

(65) Prior Publication Data

US 2002/0018525 A1 Feb. 14, 2002

(30) Foreign Application Priority Data

Jul. 25, 2000 (JP) ........................................ 2000-224400

(51) Int. Cl.[7] .............................................. H04N 7/12
(52) U.S. Cl. ............................ 375/240.25; 375/240.27
(58) Field of Search ........................ 375/240.12, 240.13, 375/240.14, 240.15, 240.25, 240.27; 348/415.1, 401.1, 409.1, 425.1; 382/236, 238, 252; 386/109, 111; 714/746–747

(56) References Cited

U.S. PATENT DOCUMENTS 6,111,915 A * 8/2000 Fukunaga et al. ..... 375/240.12
6,489,996 B1 * 12/2002 Matsumura et al. ..... 348/416.1
6,671,376 B1 * 12/2003 Koto et al. .................. 380/210
6,683,988 B1 * 1/2004 Fukunaga et al. .......... 382/236

FOREIGN PATENT DOCUMENTS

JP 11-41609 2/1999

OTHER PUBLICATIONS

Aiazzi et al., "Near lossless image compression by relaxation labeled prediction", Proceedings, International Conference on Image Processing, vol. 1, pp. 148–151, Sep. 2000.*

* cited by examiner

Primary Examiner—Vu Le
(74) Attorney, Agent, or Firm—Wenderoth, Lind & Ponack, L.L.P.

(57) ABSTRACT

When coded image data which are obtained by coding image data by a coding method including an inter-frame predictive coding process are decoded, even when the decoding is started from an inter-frame predictive coded frame, the display of a decoded image having few disturbances is started, without the display being considerably delayed from the timing of input of coded image data. An image decoding apparatus 100a for decoding coded image data and displaying a decoded image on the basis of decoded image data comprises a frame memory 112a which holds decoded image data 107 of an already processed frame as reference data which are to be used for the decoding process for the inter-frame predictive coded frame, and initializes the storage area of the frame memory 112a at the initiation of the decoding process for the coded image data.

22 Claims, 14 Drawing Sheets

IMAGE DECODING METHOD, IMAGE DECODING APPARATUS, AND DATA STORAGE MEDIUM

FIELD OF THE INVENTION

The present invention relates to image decoding methods, image decoding apparatus and data storage media and, more particularly, to decoding control or display control which enables to avoid disturbances in a display image immediately after the initiation of decoding even when a lead frame to be decoded is a frame which refers to decoded image data of other frames in the decoding process.

BACKGROUND OF THE INVENTION

In order to efficiently store or transmit digital image information (hereinafter also referred to as image data), it is required to compressively code the digital image information. In the present circumstances, as methods for compressing the digital image information, there are a Discrete Cosine Transform (DCT) which is typified by compression/decompression processes compliant with standards such as JPEG (Joint Photographic Coding Experts Group) and MPEG (Moving Picture Experts Group), as well as waveform coding methods such as a subband system, a wavelet system, and a fractal system. In the MPEG-standard-compliant compression process, an image of each frame (screen) is divided into square regions (unit regions of a coding process) called macroblocks each being composed of 16×16 pixels, the macroblock is further divided into sub-blocks each being composed of 8×8 pixels, and then the digital image information corresponding to the image of each frame is subjected to the DCT process for each sub-block. According to this DCT process, a DCT coefficient corresponding to the subblock is obtained.

As an example of methods for removing redundant image information between adjacent frames (images) to carry out the coding, there is a coding method which includes an inter-frame prediction process using motion compensation. In this coding method, initially by the inter-frame prediction process, image data of a predetermined macroblock on the current screen (processing target frame which is to be processed) are predicted with referring to image data of the previous screen (already processed frame), to generate predicted data corresponding to the predetermined macroblock. To be more specific, in the inter-frame prediction process, a reference region in the already processed frame (reference frame) is specified by a motion vector for the target macroblock to be processed in the processing target frame, and predicted data corresponding to the image data of the target macroblock are generated by a motion compensation process by which the image data of the specified reference region are referred to. Then, the image data of the predetermined macroblock are represented by differential data between the image data and the predicted data, and the differential data are waveform-coded as the image data of the predetermined macroblock.

Here, a macroblock whose image data have been coded by the coding method including the inter-frame prediction process (inter-frame predictive coding process) is referred to as an inter-macroblock. A macroblock whose image data have been coded by a coding method which does not include the inter-frame prediction process (intra-frame coding process) is referred to as an intra-macroblock. Further, an inter-frame-coded frame including an inter-macroblock is called P frame (predictive-coded frame) or P picture, and an intra-frame-coded frame which is composed of only intra-macroblocks is called I frame (intra-coded frame) or I picture. In the coding process for a P frame of MPEG, it can be selected for each macroblock whether a macroblock is handled as an inter-macroblock or intra-macroblock.

In MPEG-4 according to which image information can be processed in units of images having arbitrary shapes (hereinafter, referred to as objects) constituting one scene, a rectangular region encompassing the objects is handled as the frame (screen). This rectangular region is referred to a bounding box (BBOX), and it is a region having a width corresponding to the width of the object and a height corresponding to the height of the object. The numbers of pixels in the rectangular region in the width direction (horizontal direction) and the height direction (vertical direction) are multiples of 16, respectively. This is because the rectangular region is composed of plural macroblocks.

In MPEG-4, as the motion compensation process, non-restrictive motion compensation is permitted in which a motion vector for a target macroblock designates a region outside an already processed rectangular region as a reference region. In this case, as the pixel value of the designated reference region, the pixel value of a pixel in the already processed rectangular region, which is the nearest to the reference region, is used.

FIGS. 13(*a*)~13(*c*) are schematic diagrams for explaining the inter-frame prediction process using the non-restrictive motion compensation. Though the above-mentioned rectangular region (BBOX) has sizes which vary with variations in the object shape, assume in the description below that the size of the rectangular region (BBOX) is fixed to the maximum size (4×4 macroblocks in this case) shown in FIG. 13(*a*).

FIG. 13(*b*) shows a manner in which an arbitrary-shaped object (flying body) moves from the upper right of the rectangular region toward the lower left with the lapse of time.

In a rectangular region Bx1 for which the processing time (t=t1) is set, only a forward part of the flying body Ob appears. In a rectangular region Bx2 for which the processing time (t=t2, provided that t2>t1) is set, the major portion of the flying body Ob except its tail appears. In a rectangular region Bx3 for which the processing time (t=t3, provided that t3>t2) is set, the whole of the flying body Ob appears.

In the inter-frame predictive coding process for the rectangular region Bx2, the already processed rectangular region Bx1 is used as the reference rectangular region. For example, in the inter-frame predictive coding process taking a macroblock MBa in the rectangular region Bx2 as an inter-macroblock, a region Rra composed of 16×16 pixels in the rectangular region Bx1 is designated as the reference region by a motion vector corresponding to the macroblock MBa, and the image data (pixel values) of the reference region Rra are used as predicted data of the macroblock MBa. On the other hand, in the inter-frame predictive coding process taking a macroblock MBb in the rectangular region Bx2 as an inter-macroblock, a region Rrb composed of 16×16 pixels outside the rectangular region Bx1 is designated as the reference region by the motion vector corresponding to the macroblock MBa. In this case, since the image data (pixel values) of the reference region Rrb are not defined, the pixel value of a pixel Pfr in a macroblock Rmb in the rectangular region Bx1, which is at the nearest position to the region Rrb, is taken for each of the pixel values of all pixels Prr in the region Rrb as shown in FIG. 13(*c*), and image data which are composed of only the pixel values of the pixel Pfr are used as the predicted data of the macroblock MBb.

Hereinafter, the prior art image decoding apparatus will be specifically described.

FIG. 14 is a block diagram for explaining an example of the prior art image decoding apparatus.

This image decoding apparatus 100 receives coded image data which are obtained by subjecting image data of a series of frames which constitute an image such as a moving image, to a coding process for each macroblock, and carries out a decoding process for the coded image data for each macroblock, to generate decoded image data corresponding to each macroblock. This image decoding apparatus is mounted on a communication device such as a so-called picture phone and an image portable terminal. The coding process includes the inter-frame prediction process using the motion compensation, an orthogonal transform process such as DCT, a quantization process, a variable length coding process and the like. The decoding process includes. the inter-frame prediction process using the motion compensation, an inverse orthogonal transform process such as IDCT, an inverse quantization process, a variable length decoding process and the like.

To be more specific, the image decoding apparatus 100 includes a variable length decoder 102 for variable-length-decoding coded image data 101 of a target macroblock in a processing target frame which is to be processed, to output frequency-converted coefficient data 103 and motion vector data 108 corresponding to the target macroblock, and an inverse frequency converter 104 for inversely frequency-converting the frequency-converted coefficient data 103 to output quantized data 117.

Here, the frequency-converted coefficient data 103 are data which represent the DCT coefficient of the target macroblock, which are obtained by subjecting the image data of the target macroblock to the DCT process in sub-block units on the coding side. The motion vector data 108 are data which represent a motion vector indicating the position of the reference region whose pixel value is referred to in the reference frame, with respect to the position of the target macroblock in the processing target frame. The quantized data 117 are data which correspond to data representing a quantized coefficient, which are obtained by quantizing the DCT coefficient on the coding side.

The image decoding apparatus 100 further includes an inverse quantizer 118 for inversely quantizing the quantized data 117 to output differential data 105 corresponding to the target macroblock, and an adder 106 for adding predicted image data 109 which are obtained by the prediction process for decoded image data of the target macroblock and the differential data 105 of the target macroblock, to output decoded image data 107 of the target macroblock.

The differential data 105 of the target macroblock are differential data between local decoded image data of the target macroblock, which are obtained by subjecting the quantized coefficient of the target macroblock to the inverse quantization process and the inverse DCT process on the decoding side, and the predicted image data of the target macroblock, which are obtained by a process for referring to the image data of the reference frame to predicting the local decoded image data.

The image decoding apparatus 100 further includes an image display unit 119 for displaying a decoded image on the basis of the decoded image data 107, a frame memory 112b for temporarily holding the decoded image data 107 which are output from the adder 106 as the image data of the reference frame, and a motion compensator 110 for generating the predicted image data 109 of the target macroblock on the basis of the image data 111 of the reference frame which are stored in the frame memory 112b and the motion vector data 108.

Next, the operation of the image decoding apparatus will be described.

When the coded image data 101 are input to this image decoding apparatus 100, the frequency-converted coefficient data 103 and the motion vector 108 of respective macroblocks are successively output by the variable length decoding process for the input coded image data 101 in the variable length decoder 102.

Then, when the frequency-converted coefficient data 103 are input to the inverse frequency converter 104, the frequency-converted coefficient data 103 are converted into the quantized data 117 by the inverse frequency conversion for each subblock, and the quantized data 117 of the each macroblock are output to the inverse quantizer 118. In the inverse quantizer 118, the quantized data 117 of each macroblock are converted by the inverse quantization process into the differential data 105 of each macroblock, and the differential data 105 are output to the adder 106.

Then, in the adder 106, the predicted image data 109 of the target macroblock which is a target of the decoding process and the differential data 105 of the target macroblock are added, and the decoded image data 107 of the target macroblock are output.

When the decoded image data 107 which are output from the adder 106 are input to the image display unit 119, the image display unit 119 displays the decoded image on the basis of the decoded image data 107.

On the other hand, the decoded image data 107 which are output from the adder 106 are temporarily stored by the frame memory 112b as the image data of the reference frame.

In the motion compensator 110, the predicted image data 109 of the target macroblock are generated on the basis of the image data 111 of the reference frame which are stored in the frame memory 112b and the motion vector data of the target macroblock, and the predicted image data 109 are output to the adder 106.

In P frames, redundant image information is removed from by performing the inter-frame prediction. Accordingly, the amount of codes of coded image data corresponding to P frames is commonly smaller than the amount of codes of coded image data of I frames. Thus, when image information is transmitted via a transmission line having a lower transmission rate, there are cases where the coding of image data is carried out taking only the lead frame in the image as an I frame and all of the following frames as P frames, to increase the coding efficiency.

In cases where this coding is carried out, the technique called intra-refresh is often used to prevent an error due to a difference in the arithmetic precision between the coding side devices and the decoding side devices or a transmission error from affecting subsequent frames. In this technique, a coding process in which a fixed number of macroblocks at predetermined positions in a P frame are taken as intra-macroblocks is carried out with successively changing the position of the macroblock which is taken as the intra-macroblock for each P frame.

FIG. 15 is a diagram for explaining the coding process with the intra-refresh.

In the description below of the coding process with the intra-refresh, a case where for a lead frame F1 of an image, the intra-frame coding process taking this frame F1 as an I frame is performed, and for frames F2 to F25 following the frame F1, the inter-frame coding process taking these frames as P frames is performed is shown as a specific example. Assume here that the image has fixed shape and size:, and that the size of each frame is 8 macroblocks (horizontal direction)×6 macroblocks (vertical direction). In addition, assume that four macroblock are taken as the intra-macroblocks. Further, assume that timings when the decoding process is started for the frames F1~F25 are time (t=t1)~time (t=t25), respectively.

Since the lead frame F1 is an I frame, the intra-frame coding process without using the inter-frame prediction is performed for all macroblocks MB in the frame. For the frames F2~F25 following the frame F1 the inter-frame coding process using the inter-frame prediction is performed, because these frames are P frames.

Here, the intra-refresh is performed in the coding process for P frames. Initially in the first P frame F2, the first to fourth macroblocks MB1 to MB4 from the left of the first row are processed as the intra-macroblocks. In the next P frame F3, the fifth to eighth macroblocks MB5 to MB8 from the left of the first row are processed as the intra-macroblocks. Further, in the P frame F4, the first to fourth macroblocks MB9 to MB12 from the left of the second row are processed as the intra-macroblocks.

As apparent from the above descriptions, also in the subsequent P frames F5 to F13, four macroblocks are similarly processed as the intra-macroblocks successively. For example, macroblocks MB21 to MB24 in the P frame F7, macroblocks MB25 to MB28 in the P frame F8, and macroblocks MB45 to MB48 in the P frame F13 are processed as the intra-macroblocks.

In the coding process for each P frame, it goes without saying that macroblocks other than the macroblocks as the intra-refresh targets are also processed as the intra-macroblocks when the correlation of intra-frame pixel values is stronger than the correlation of inter-frame pixel values. It is also needless to say that the number of macroblocks in each P frame, which are processed as the intra-macroblocks by the intra-refresh is not limited to four.

When the coding processes for the P frames F2 to F13 have been completed, the macroblocks MB1 to MB48 at the respective macroblock positions in the frames have been processed as the intra-macroblocks at least once. In other words, regions at all macroblock positions in the P frame F14 next to the P frame F13 have been subjected to the inter-frame coding process at least once in the coding processes for the P frames F2 to F13.

Thereafter, for the P frames F14 to F25, in the same manner as those in the P frames F2 to F13, the coding process in which four macroblocks are taken as the intra-macroblocks is performed successively. For example, the macroblocks MB1 to MB4 in the P frame F14, the macroblocks MB5 to MB8 in the P frame F15, and the macroblocks MB45 to MB48 in the P frame F25 are processed as the intra-macroblocks.

When this intra-refresh technique is used, even when a certain P frame has an abnormal macroblock which cannot be decoded properly due to errors or the like, a macroblock in the following P frame subsequent to the certain P frame, which is at the same position as that of the abnormal macroblock is properly decoded on the basis of a frame in which that macroblock is taken as the intra-macroblock. This is because a macroblock which is at the same macroblock position in each P frame is periodically (every 12 frames in the example shown in FIG. 15) subjected to the coding process as the intra-macroblock.

For example, even when the P frame F3 has an abnormal macroblock MB28 (the fourth macroblock from the left of the fourth row) which cannot be properly decoded due to errors or the like, the decoding process is properly performed for a macroblock which is at the same position as that of the abnormal macroblock MB28, on the basis of the frame F8 in which this macroblock is taken as the intra-macroblock.

However, as described above, in cases where coded image data which are obtained by coding image data by the coding method including not only the intra-frame coding process but also the inter-frame coding process are subjected to the decoding process, the inter-frame decoding process is performed for coded image data of P frames in which an already processed frame is used as a reference frame and the pixel values of the reference frame are referred to.

Thus, in the prior art decoding apparatus, when the decoding process is started from a P frame, since pixel values of the reference frame are undefined, pixel values constituting decoded image data are also undefined.

Consequently, when the decoding process is started from a P frame as described above, a decoded image having undefined pixel values is displayed, resulting in a disturbance in a display image.

It is conceivable that this problem that a decoded image having undefined pixel values is displayed may be avoided by not displaying a decoded image before the decoding process for at least one I frame has been completed after the decoding process was started from a P frame. However, when these measures are taken, the delay time from when coded image data are input to the decoding apparatus till a decoded image is displayed is increased.

SUMMARY OF THE INVENTION

It is an object of the present invention to provide an image decoding method, an image decoding apparatus, and a data storage medium, which can display a decoded image having pixel values which are determined to predetermined values, successively starting from a frame whose decoding process has been completed, reduce the delay time from the data input, and display the decoded images satisfactorily, even when the decoding process is started from a P frame.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, there is provided an image decoding method including a decoding process for decoding coded image data which are obtained by coding image data of each frame for displaying a predetermined image, to generate decoded image data, and a display process for displaying a decoded image on the basis of the decoded image data, and the decoding process includes: an intra-frame decoding process of decoding coded image data of a processing target frame which is to be decoded, without referring to decoded image data of an already processed frame the decoding process of which has been completed; and an inter-frame decoding process of decoding coded image data of a processing target frame which is to be decoded, with referring to decoded image data of an already processed frame the decoding process of which has been completed, and when the decoded image data of the already processed frame as a reference frame which is to be referred to in the decoding of the coded image data of the processing target frame are undefined, the inter-frame decoding process refers to preset image data for displaying a preset image in place of decoded image data of the reference frame. Therefore, even when the decoded image data of the already processed frame as the reference frame are not fixed, the display of a decoded image can be satisfactorily performed on the basis of the decoded image data which are obtained by the inter-frame decoding process for each frame, with suppressing the delay time from the initiation of the decoding of the coded image data.

According to a 2nd aspect of the present invention, in the image decoding method of the 1st aspect, the decoding process comprises: deciding coded image data which are obtained by subjecting image data of a processing target frame which is to be coded, to an intra-frame coding process of carrying out coding without referring to image data of an already processed frame the coding process of which has been completed, by the intra-frame decoding process; and decoding coded image data which are obtained by subjecting image data of a processing target frame which is to be coded, to an inter-frame coding process for carrying out coding with referring to image data of an already processed frame the coding process of which has been completed, by the inter-frame decoding process, and the inter-frame decoding process refers to the preset image data, when a processing target frame which is to be decoded first is a frame which has been subjected to the inter-frame coding process. Therefore, even when the decoding process is started from an inter-frame coded frame which has been subjected to the inter-frame coding process, the display of a decoded image can be satisfactorily performed on the basis of decoded image data which are obtained by the inter-frame decoding process for the inter-frame coded frame, with suppressing the delay time from the initiation of the decoding of the coded image data.

According to a 3rd aspect of the present invention, in the image decoding method of the 1st aspect, an initialization process is carried out for writing the preset image data as initialization data in a storage area of a frame memory which contains the decoded image data of the reference frame, prior to start of the decoding process. Therefore, image data of various kinds of images can be provided for the preset image data which are referred to in the inter-frame decoding process for the processing target frame, in place of the decoded image data of the already processed frame.

According to a 4th aspect of the present invention, in the image decoding method of the 1st aspect, an initialization process is carried out for writing the preset image data as initialization data in a storage area of a frame memory which contains the decoded image data of the reference frame prior to start of the decoding process, even when a processing target frame which is to be decoded first is a frame which has been subjected to the intra-frame-coding process, and when an error is detected in a region of image data of the frame which has been subjected to the intra-frame coding process, pixel values of image data of a region corresponding to the region in which the error is detected, the image data being stored in a storage area of the frame memory, are displayed in the region in which the error is detected. Therefore, when an error occurs in a frame which has been subjected to the intra-frame processing, the error handling process can be commonly performed regardless of whether the frame in which the error occurs is a lead frame or other frames, whereby the size of a program storage memory can be reduced. This is advantageous to devices which require further miniaturization, such as portable terminals.

According to a 5th aspect of the present invention, in the image decoding method of the 1st aspect, when an error is detected in the coded image data of the processing target frame, an initialization process is carried out for writing the preset image data as initialization data in a storage area of a frame memory which contains decoded image data of the reference frame, prior to the decoding of the processing target frame in which the error is detected. Therefore, the preset image data in the frame memory can be displayed in an error area of coded image data in which an error occurs, whereby an image not having undefined pixel values can be displayed as a decoded image corresponding to the processing target frame.

According to a 6th aspect of the present invention, in the image decoding method of the 1st aspect, when an error is detected in the coded image data of the processing target frame, a fatality of the error is judged prior to the decoding of the processing target frame in which the error is detected; when the fatality of the error is higher, an initialization process is carried out for writing the preset image data as initialization data in a storage area of a frame memory which contains the decoded image data of the reference frame; and when the fatality of the error is lower, the initialization process is not carried out. Therefore, the initialization of the frame memory which is performed when an error occurs is performed only in cases when the fatality of the error is higher, whereby the image quality of image data to be displayed can be improved.

According to a 7th aspect of the present invention, in the image decoding method of the 1st aspect, image data including character information are used as the preset image data. Therefore, in a situation where decoded image data of an already processed frame which is referred to in the inter-frame decoding process for the processing target frame include many undefined pixel values, an image including various messages can be displayed as the decoded image.

According to an 8th aspect of the present invention, in the image decoding method of the 1st aspect, an initialization process is carried out for writing the preset image data as initialization data in part of a storage area of a frame memory which contains the decoded image data of the reference frame prior to start of the decoding process, and decoded image data which are stored in the part of the storage area of the frame memory are used as the decoded image data of the reference frame. Therefore, the amount of data which are processed in the initialization process can be reduced.

According to a 9th aspect of the present invention, in the image decoding method of the 8th aspect, the intra-frame coding process and the inter-frame coding process are carried out for the image data of each frame for each unit area in the frame, and a size of an image corresponding to the part of the storage area of the frame memory is the same as a size of the unit area of the coding processes. Therefore, the amount of data which are processed in the initialization process can be minimized.

According to a 10th aspect of the present invention, in the image decoding method of the 1st aspect, image data which are composed of predetermined pixel values are used as the preset image data. Therefore, influences of the preset image data upon decoded image data which are obtained by the inter-frame decoding process, which appear on a decoded image, can be reduced.

According to an 11th aspect of the present invention, there is provided an image decoding method which includes a decoding process for decoding coded image data which are obtained by subjecting image data of a processing target frame which is to be coded, to one of an intra-frame coding process of carrying out coding without referring to image data of an already processed frame which has been coded and an inter-frame coding process of carrying out coding with referring to the image data of the already processed frame, for each unit area of the processing target frame, to generate decoded image data, and a display process for displaying a decoded image on the basis of the decoded image data, and the decoding process includes: an intra-frame decoding process of decoding coded image data of an intra-frame coded frame being composed of only unit areas which have been subjected to the intra-frame coding process, without referring to decoded image data of an already processed frame the decoding process of which has been completed; and an inter-frame decoding process of decoding coded image data of an inter-frame coded frame including an unit area which has been subjected to the inter-frame coding process, with referring to decoded image data of an already processed frame the decoding process of which has been completed, and starts the intra-frame decoding process or the inter-frame decoding process, regardless of whether a lead frame which is to be decoded is the intra-frame coded frame or the inter-frame coded frame, and when the lead frame is the inter-frame coded frame, the display process starts display of a decoded image from a predetermined frame subsequent to the lead frame on the basis of decoded image data thereof. Therefore, the display of a decoded image can be performed, with the delay time from the initiation of the decoding of coded image data being suppressed as well as without excessive disturbances in the decoded image being led.

According to a 12th aspect of the present invention, in the image decoding method of the 11th aspect, when a series of inter-frame coding processes for consecutive N (N is a natural number) frames have been completed, said coding process encodes image data of the respective frames such that all unit areas in a processing target frame become areas which have been subjected to the intra-frame coding process at least once during the series of the inter-frame coding process, and when the lead frame is the inter-frame coded frame, said display process starts display of a decoded image from an N-th frame from the lead frame on the basis of decoded image data thereof. Therefore, the display of a decoded image is performed as soon as the pixel values of the decoded image are fixed to significant values. To be more specific, not only the display of a decoded image having undefined pixel values can be prevented, but also a decoded image of decoded image data not having undefined pixel values can be displayed at a time when the decoded image data have been generated, without waiting for the decoding of coded image data corresponding to an intra-frame coded frame. Further, it is not required to judge whether all macroblocks in the processing target frame have been processed as intra-macroblocks.

According to a 13th aspect of the present invention, in the image decoding method of the 11th aspect, when a series of inter-frame coding processes for a predetermined number of consecutive frames have been completed, said coding process encodes image data of the respective frames such that all unit areas in a processing target frame become areas which have been subjected to the intra-frame coding process at least once during the series of the inter-frame coding processes, and when the lead frame is the inter-frame coded frame, said display process detects a specific inter-frame coded frame which is later than the lead frame, all unit areas of which frame are areas which have been subjected to the intra-frame coding process at least once during the series of the inter-frame coding process, and starts display of a decoded image from the specific inter-frame coded frame on the basis of decoded image data thereof. Therefore, the display of a decoded image is performed as soon as the pixel values of the decoded image are fixed to significant values. That is, with avoiding the display of a decoded image having undefined pixel values, a decoded image of decoded image data not having undefined pixel values can be displayed as soon as the decoded image data are generated.

According to a 14th aspect of the present invention, there is provided an image decoding apparatus which receives coded image data which are obtained by coding image data of each frame for displaying a predetermined image, and decodes the coded image data to generate decoded image data, comprising: a decoding unit for carrying out one of an intra-frame decoding process of decoding coded image data of a processing target frame which is to be decoded, without referring to decoded image data of an already processed frame the decoding process of which has been completed, and an inter-frame decoding process of decoding coded image data of a processing target frame which is to be decoded, with referring to decoded image data of an already processed frame the decoding process of which has been completed; an image display unit for displaying a decoded image on the basis of the decoded image data; a frame memory for temporarily containing decoded image data of an already processed frame which is referred to in the inter-frame decoding process; and an initialization unit for initializing the frame memory in accordance with an initialization control signal which is give from outside. Therefore, even when decoded image data of an already processed frame as the reference frame for the processing target frame are not fixed, the display of a decoded image can be satisfactorily performed on the basis of decoded image data which are obtained by the inter-frame decoding process for the processing target frame, with the delay time from the input timing of the coded image data being suppressed.

According to a 15th aspect of the present invention, in the image decoding apparatus of the 14th aspect, the initialization control signal is given from outside, when the decoding process is started or when an error is detected in the coded image data. Therefore, the preset image data in the frame memory can be displayed in an error area of the coded image data in which an error occurs, whereby an image not having undefined pixel values can be displayed as a decoded image corresponding to the processing target frame.

According to a 16th aspect of the present invention, in the image decoding apparatus of the 14th aspect, the initialization control signal is given from outside, when the decoding process is started or when an error is detected in the coded image data and a fatality of the detected error is judged higher. Therefore, the initialization of the frame memory which is performed when an error occurs is performed only in cases where the fatality of the error is higher, whereby the image quality of the image data to be displayed can be improved.

According to a 17th aspect of the present invention, the image decoding apparatus of the 14th aspect comprises: an initialization control unit for deciding, on the basis of the input timing of the coded image data, a decoding start timing when the decoding process of the coded image data is to be started, and outputting an initialization control signal to the initialization unit prior to the decoding start timing. Therefore, even when the decoding process is started from an inter-frame coded frame which has been subjected to the inter-frame coding process, the display of a decoded image can be satisfactorily performed on the basis of decoded image data which are obtained by the inter-frame decoding process for the inter-frame coded frame, with the delay time from the input timing of the coded image data being suppressed. Further, since the initialization control signal is generated inside in the apparatus, the interface with the external device can be simplified.

According to an 18th aspect of the present invention, in the image decoding apparatus of the 17th aspect, the initialization control unit detects an error in the coded image data, decides a decoding timing of the coded image data in which the error is detected on the basis of a timing of occurrence of the error, and outputs the initialization control signal to the initialization control unit prior to the decoding timing of the coded image data in which the error is detected. Therefore, the display of a decoded image can be satisfactorily performed on the basis of decoded image data which are obtained by the inter-frame decoding process for the inter-frame coded frame, with the delay time from the input timing of the coded image data being suppressed. Further, when an error is detected in image data of the processing target frame, the display of decoded image data after the error is processed can be satisfactorily performed, with the delay time from the timing of error occurrence being suppressed.

According to a 19th aspect of the present invention, in the image decoding apparatus of the 17th aspect, the initialization control unit detects an error in the coded image data, judges a fatality of the error, and decides a decoding timing of the coded image data in which the error is detected on the basis of a timing of occurrence of the error, and when the fatality of the error is higher, outputs the initialization control signal to the initialization unit prior to the decoding timing of the coded image data in which the error is detected, and when the fatality of the error is lower, does not output the initialization control signal to the initialization unit. Therefore, the initialization of the frame memory which is performed when an error occurs is performed only in cases where the fatality of the error is higher, whereby the image quality of image data to be displayed can be improved.

According to a 20th aspect of the present invention, there is provided an image decoding apparatus which decodes coded image data obtained by subjecting image data of a processing target frame which is to be coded, to one of an intra-frame coding process which does not refer to image data of an already processed frame which has been coded, and an inter-frame coding process which refers to the image data of the already processed frame, for each unit area of the processing target frame, to generate decoded image data, comprising: a decoding unit for decoding coded image data of an intra-frame coded frame being composed of only unit areas which have been subjected to the intra-frame coding process, without referring to decoded image data of an already processed frame the decoding process of which has been completed, as well as decoding coded image data of an inter-frame coded frame including a unit area which has been subjected to the inter-frame coding process, with referring to decoded image data of an already processed frame the decoding process of which has been completed, to output the decoded image data; an image display unit for displaying a decoded image on the basis of the decoded image data which are output from the decoding unit; a switch which is provided between the decoding unit and the image display unit; and a switch control unit for deciding, on the basis of the coded image data, a display start timing when display of a decoded image of each frame is started, and controlling the switch to open or close on the basis of the display start timing. Therefore, the display of a decoded image on the basis of decoded image data of each frame can be performed with the delay time from the input timing of the coded image data being suppressed as well as without excessive disturbances in the decoded image being led. To be more specific, the display of a decoded image can be started after many or all macroblocks in a frame which has been decoded are processed as intra-macroblocks. Accordingly, even when coded image data of an intra-frame coded frame are not input, a correct decoded image or an image which is like the correct one can be displayed on the basis of decoded image data which are obtained by the decoding process of coded image data of the inter-frame coded frame, with little delay from the input of the coded image data.

According to a 21st aspect of the present invention, there is provided a data storage medium which contains an image decoding program for implementing a decoding process for decoding coded image data which are obtained by coding image data of each frame for displaying a predetermined image, to generate decoded image data, and a display process for displaying a decoded image on the basis of the decoded image data, by a computer, and the decoding process includes: an intra-frame decoding process of decoding coded image data of a processing target frame which is to be decoded, without referring to decoded image data of an already processed frame the decoding process of which has been completed; and an inter-frame decoding process of decoding coded image data of a processing target frame which is to be decoded, with referring to decoded image data of an already processed frame the decoding process of which has been completed, and when decoded image data of an already processed frame as a reference frame which is referred to when the coded image data of the processing target frame are decoded are undefined, the inter-frame decoding process refers to preset image data for displaying a preset image, in place of the decoded image data of the reference frame. Therefore, a decoding control process for satisfactorily performing the display of a decoded image on the basis of decoded image data which are obtained by the inter-frame decoding process for each frame even when decoded image data of a processing target frame as the reference frame are not fixed, with the delay time from the initiation of decoding of the coded image data being suppressed, can be realized by software.

According to a 22nd aspect of the present invention, there is provided a data storage medium which contains an image decoding program for implementing a decoding process for decoding coded image data which are obtained by subjecting image data of a processing target frame which is to be coded, to one of an intra-frame coding process of carrying out coding without referring to image data of an already processed frame which have been coded, and an inter-frame coding process of carrying out coding with referring to the image data of the already processed frame, for each unit area of the processing target frame, to generate decoded image data, and a display process for displaying a decoded image on the basis of the decoded image data, by a computer, and the decoding process includes: an intra-frame decoding process of decoding coded image data of an intra-frame coded frame being composed of only unit areas which have been subjected to the intra-frame coding process, without referring to decoded image data of an already processed frame the decoding process of which has been completed; and an inter-frame decoding process of decoding coded image data of an inter-frame coded frame including a unit area which has been subjected to the inter-frame coding process, with referring to decoded image data of an already processed frame the decoding process of which has been completed, starts the intra-frame decoding process or the inter-frame decoding process, regardless of whether a lead frame which is to be decoded is the intra-frame coded frame or the inter-frame coded frame, and when the lead frame is the inter-frame coded frame, the display process starts display of a decoded image from a predetermined frame which is later than the lead frame on the basis of decoded image data thereof. Therefore, a display control process for performing the display of a decoded image with the delay time from the initiation of the decoding of coded image data being suppressed as well as without excessive disturbances in a decoded image being led can be realized by software.

BRIEF DESCRIPTION OF THE DRAWINGS

FIG. 3(a) shows a case where initialization is not performed and FIG. 3(b) shows a case where initialization is performed.

DETAILED DESCRIPTION OF THE PREFERRED EMBODIMENTS

Hereinafter, embodiments of the present invention will be described.

Embodiment 1

Figure 1:
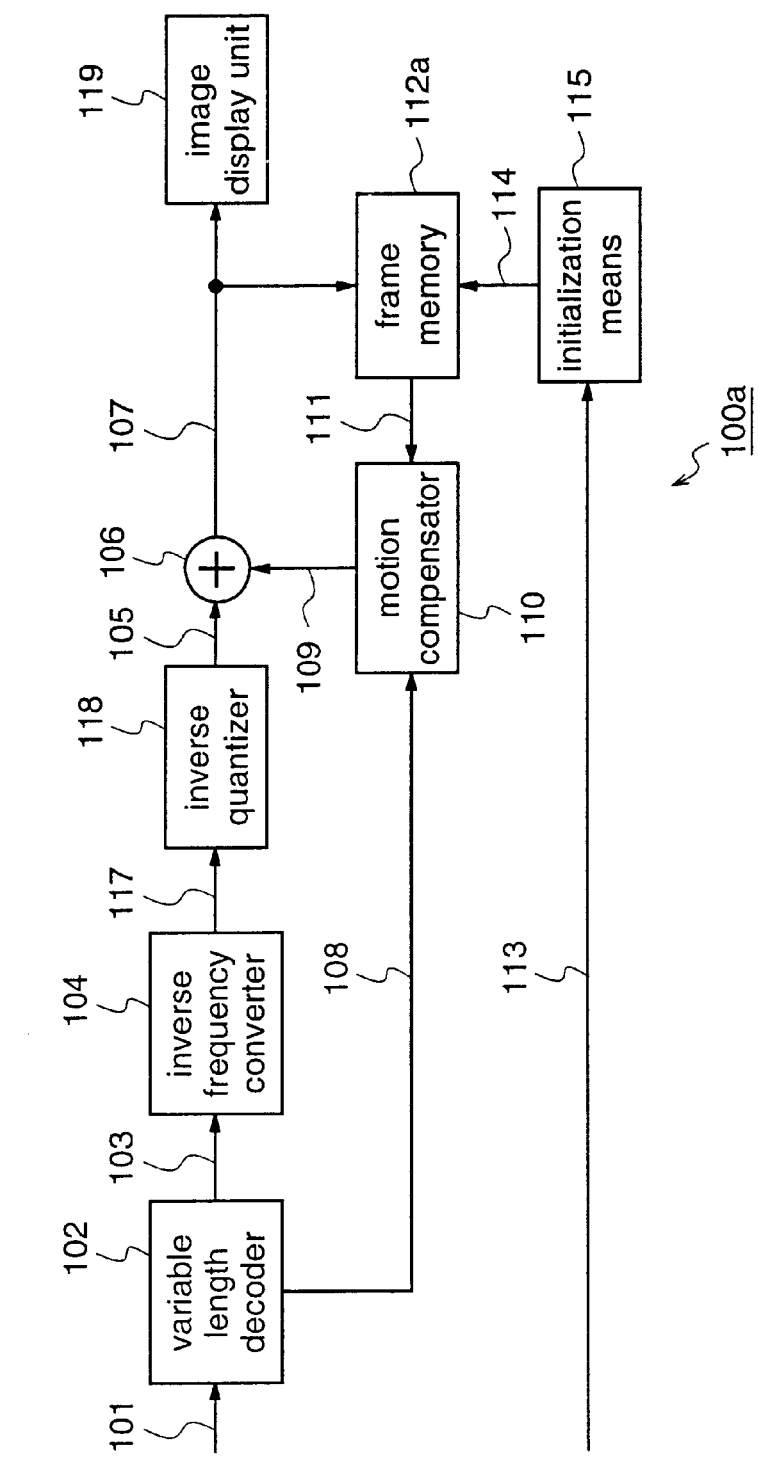
FIG. 1 is a block diagram for explaining an image decoding apparatus according to a first embodiment of the present invention.

FIG. 1 is a block diagram illustrating a structure of an image decoding apparatus according to the first embodiment of the present invention.

The image decoding apparatus 100a according to the first embodiment is mounted on a communication device such as a picture phone, has a frame memory 112a which can initialize a data storage area in place of the frame memory 112b in the prior art image decoding apparatus 100, and further comprises an initialization means 115 for initializing the frame memory 112a in accordance with an initialization control signal 113 from outside.

To be more specific, the initialization means 115 is constructed so as to subject the storage area in the frame memory 112a to a process in which initialization data 114 composed of predetermined pixel values overwrite unfixed values as the initialization process, to perform a preset screen display, for example an entirely blue or gray screen display, when the initialization control signal 113 is given to the initialization means 115 from outside at the initiation of the decoding process. When the communication device on which the image decoding apparatus 100a is mounted is powered on, the initialization control signal 113 is supplied to the initialization means 115 of the image decoding apparatus 100a.

Other construction of the image decoding apparatus 100a is identical to that of the prior art image decoding apparatus 100.

Next, the operation of the image decoding apparatus is described.

In this first embodiment, when the communication device on which the image decoding apparatus 100a is mounted is powered on, the initialization control signal 113 is supplied to the initialization means 115 of the image decoding apparatus 100a, as well as the decoding process for the input coded image data 101 is started.

Then, in the frame memory 112a, the process for setting the initialization data 114 which are composed of the predetermined pixel values in the entire data storage area to perform an entirely blue or gray screen display is carried out by the initialization means 115 before the frame memory 112a is referred to in the decoding process.

Then, the decoding process for the coded image data 101 is carried out. In the first embodiment, the decoding process is carried out in the same way as in the prior art image decoding apparatus 100 except in that the setting of the initialization data in the frame memory 112a is added. To be more specific, the variable length decoding process for the coded image data 101 is carried out by the variable length decoder 102, and frequency-converted coefficient data 103 and motion vector data 108 corresponding to respective macroblocks are successively output.

The frequency-converted coefficient data 103 are converted into differential data 105 by the processes of the inverse frequency converter 104 and the inverse quantizer 118. Further, in the adder 106, the differential data 105 of the target macroblock and predicted image data 109 of the target macroblock are added, and decoded image data 107 of the target macroblock are output to the image display unit 119 and the frame memory 112a. In the image display unit 119, a decoded image is displayed on the basis of the decoded image data 107. In the frame memory 112a, the decoded image data 107 of the target macroblock are written in a part of the data storage area, corresponding to the target macroblock.

At a time when the decoding process for one frame of coded image data has been completed, the decoded image data 107 corresponding to the one frame are stored in the frame memory 112a as the reference image data 111.

For example, in a case where a lead frame which is to be decoded is a P frame, at a time when the decoding process for the lead frame has been completed, decoded image data which are obtained by adding the initialization data and the differential data are stored in the frame memory 112a as reference image data for a frame subsequent to the lead frame. The reference image data in this case are extremely like to the initialization data, because the amount of information of the differential data is extremely small.

In a case where a lead frame which is to be decoded is an I frame, the initialization of the frame memory 112a by the initialization means 115 in accordance with the initialization control signal 113 can be omitted. In this case, at a time when the decoding process for the lead frame has been completed, decoded image data corresponding to the I frame as the lead frame are stored in the frame memory 112a as the reference image data-for a frame subsequent to the lead frame.

In the motion compensator 110, predicted image data 109 of the target macroblock are generated on the basis of the reference image data 111 which are stored in the frame memory 112a and the motion vector data 108 of the target macroblock, and the predicted image data 109 are output to the adder 106.

As described above, according to the first embodiment, in the image decoding apparatus 100a which decodes the coded image data 101 to display the decoded image on the image display unit 119 on the basis of the decoded image data 107, the frame memory 112a is included which holds the decoded image data 107 of the already processed frame as the reference image data 111 which are used in the decoding process for the inter-frame predictive coded frame, and the initialization process in which the initialization data 114 are written in the data storage area in the frame memory 112a is carried out at the initiation of the decoding process for the coded image data. Therefore, even in cases where the decoding process is started from a P frame, the initialization data are referred to in the decoding process corresponding to each inter-macroblock of the P frame, and the image data of the reference frame do not have undefined pixel values. Accordingly, an image whose pixel values are not undefined can be displayed as the decoded image corresponding to the P frame.

According to this first embodiment, even when the decoding process is started from a P frame, corresponding decoded images are displayed successively starting from a frame whose decoding process has been completed. Therefore, in cases where coded image data starting from a P frame are input, the delay time from the input of the coded image data until a decoded image is displayed can be reduced, as compared to the method by which the display of a decoded image is delayed until the decoding process for at least one I frame has been completed.

In this first embodiment, the frame memory 112a is initialized when the decoding process is started. However, the timing of initialization of the frame memory 112a can be delayed as required from the initiation of the decoding process, as long as the initialization can be completed before the decoding process proceeds and then the frame memory 112a is first referred to.

Further, according to the first embodiment, in cases where the lead frame is an I frame, the initialization of the frame memory 112a by the initialization means 115 at the initiation of the decoding process can be omitted. However, it is also possible to always perform the initialization of the frame memory 112a when the decoding process is started, regardless of the kinds of the lead frame.

Figure 2:
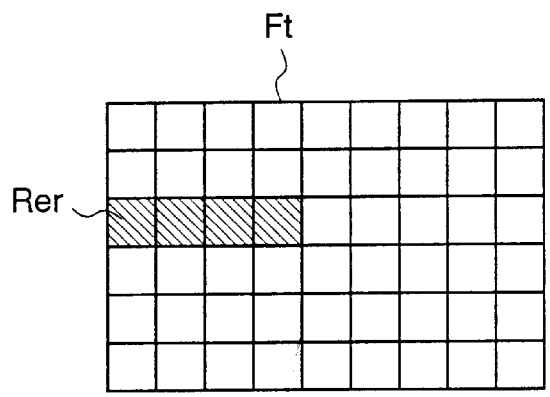
FIG. 2 are diagrams showing an error handling method in a case where an error occurred in the image decoding apparatus according to the first embodiment, FIG. 2(a) showing a processing target frame and FIG. 2(b) showing a reference frame.
Figure 2:
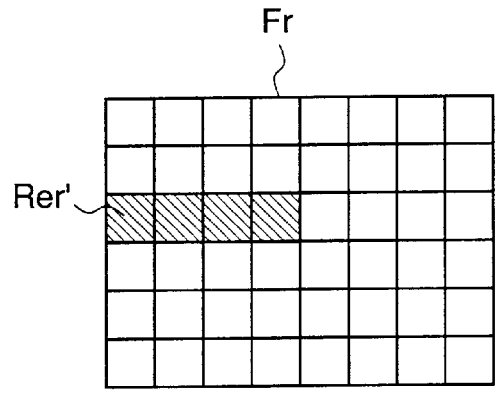

Here, a description is given of the error handling method in a case where an error such as a transmission error occurred in image data of a processing target frame. As shown in FIGS. 2(a) and 2(b), in a region Rer where an error occurred in the processing target frame Ft, pixel data of a region Rer corresponding to the error region of the processing target frame of a reference frame Fr are displayed, thereby preventing undefined values from being displayed on the processing target frame.

Figure 3:
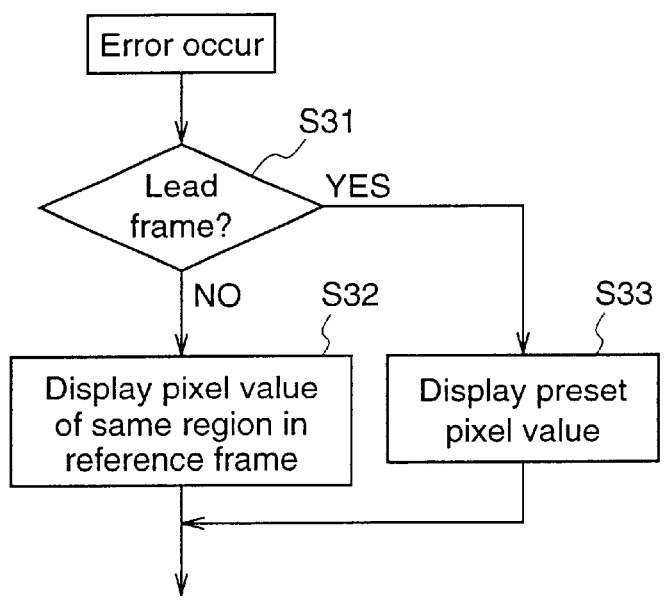
FIG. 3 are flowcharts in a case where a processing target frame in which an error occurred is an I frame in the image decoding apparatus according to the first embodiment.
Figure 3:
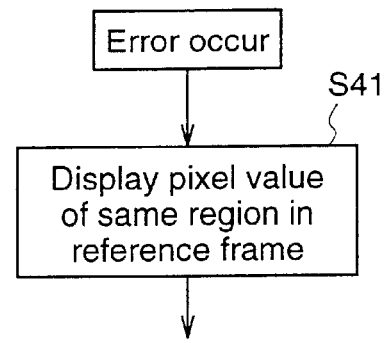

To be more specific, in a case where the coded image data in which the error occurred are not the lead frame, since the decoded image data 107 which have been previously processed are stored in the frame memory 112a, regardless of whether the frame is an I frame or a P frame. Therefore, as described above, the decoded image data are used as the reference frame, and in a region where the error occurred in the processing target frame, the image data of the region in the reference frame, corresponding to the error region of the processing target frame are displayed. In a case where the coded image data where the error occurred is the lead frame, when the coded image data is a P frame, since the frame memory 112a has been initialized before the initiation of the decoding process, the above-mentioned error handling process is carried out. When the coded image data is an I frame, since the initialization of the frame memory 112a is not performed, the above-mentioned error handling results in the display of undefined values. Accordingly, another error handling process is carried out, for example for displaying previously programmed preset pixel data in the error region. When the coded image data where the error occurred is an I frame, the error handling depends on whether the frame is a lead frame or not. As shown in the flowchart of FIG. 3(a), initially in step S31, it is judged whether the processing target frame is a lead frame or not. When the processing target frame is the lead frame, in step S33, a previously programmed preset value is displayed in the error region. When the processing target frame is not the lead frame, in step S32, the process of displaying pixel values of the region in the reference frame, corresponding to the error region or the like is required.

However, when the initialization of the frame memory 112a by the initialization means 115 is always performed before the decoding process is started regardless of kinds of the lead frame, even when the processing target frame where the error occurred is an I frame and the lead frame, the above-mentioned error handling process does not lead to the display of undefined values. Thus, when the frame where the error occurred is an I frame, it is not required to select a separate error handling process according to whether the frame is a lead frame or not. Accordingly, whichever frame has the error, the above-mentioned error handling process can be carried out in step S41 for displaying the pixel values of the region of the reference frame, corresponding to the error region of the processing target frame, in the error region, as shown in the flowchart of FIG. 3(b). Consequently, the error handling program can be commonly used by the lead frame and other frames, whereby the size of the program in the apparatus can be reduced, and the size of a program storage memory can be reduced. This is advantageous to devices which require a further miniaturization, such as portable terminals.

The initialization of the frame memory 112a by the initialization means 115 is carried out not only when the decoding process is started but can be carried out also when an error such as a transmission error of the coded image data 101 occurred, because in such a case the size of the coded image data may be changed, whereby an error which cannot be handled by the above-mentioned error handling process in which image data in the frame memory 112a are referred to may occur. As a specific structure in this case, a structure where an error detector for detecting an error in coded image data is provided in a previous stage of the image decoding apparatus 100a, and the initialization control signal 113 is supplied to the initialization means 115 on the basis of error detection output of the error detector is conceivable.

In this first embodiment, the initialization control signal 113 is generated outside the image decoding apparatus, while the initialization control signal 113 can be generated inside the image decoding apparatus as in a variant shown below.

Further, in this first embodiment, the data to be decoded are coded image data which have been subjected to the coding involving the intra-refresh, while the data can be subjected to the coding not involving the intra-refresh.

Variant of Embodiment 1

Hereinafter, an image decoding apparatus which generates an initialization control signal inside the image decoding apparatus will be described as a variant of the first embodiment of the present invention.

Figure 4:
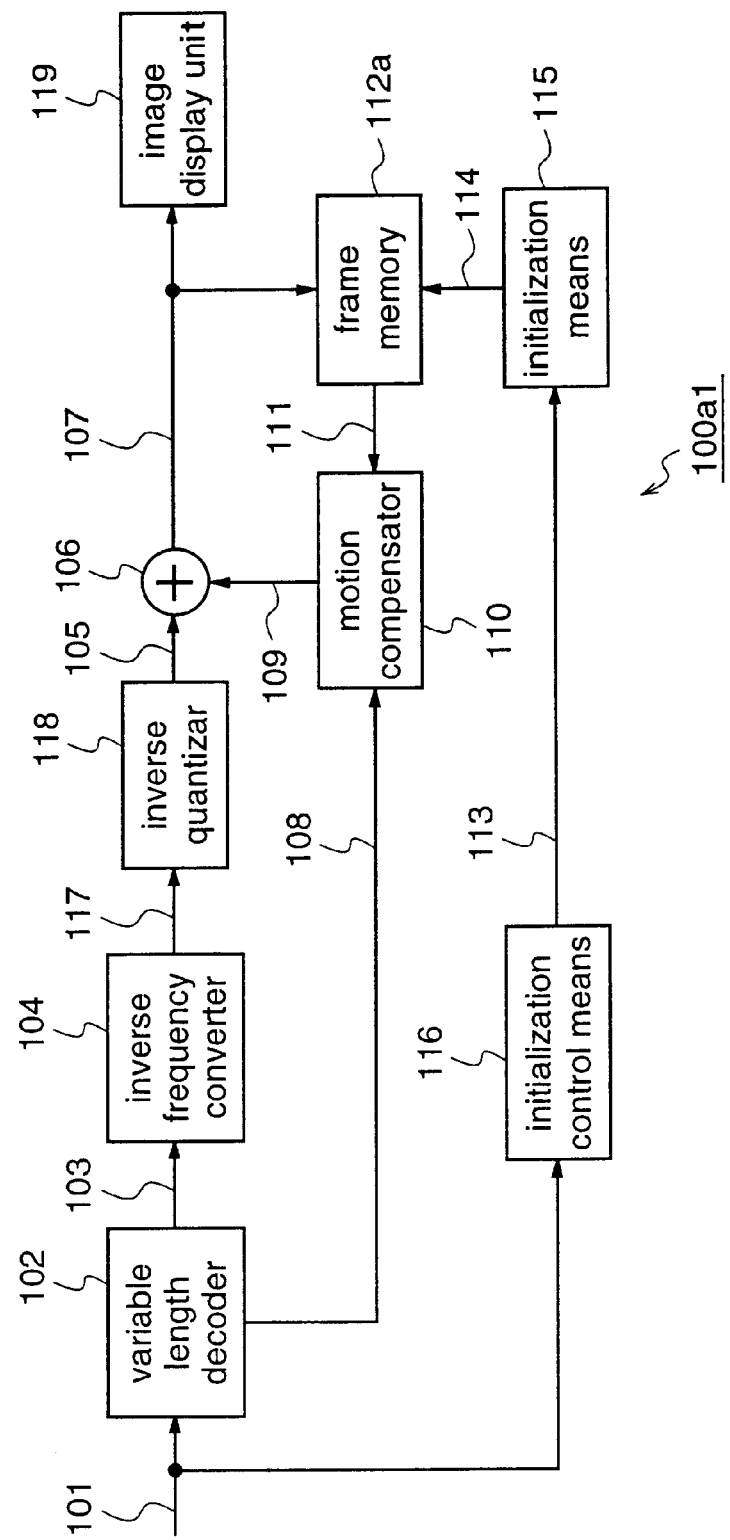
FIG. 4 is a block diagram for explaining an image decoding apparatus according to a variant of the first embodiment of the present invention.

FIG. 4 is a block diagram for explaining the image decoding apparatus according to the variant of the first embodiment.

The image decoding apparatus 100a1 according to the variant of the first embodiment has, in addition to the elements of the image decoding apparatus 100a of the first embodiment, an initialization control means 116 for deciding a decoding start timing on the basis of a timing when a first code of coded image data 101 is input, and outputting an initialization control signal 113 to an initialization means 115 before the decoding start timing.

Since the initialization control signal 113 is generated inside the so-constructed image decoding apparatus 100a1, the interface between the image decoding apparatus 100a1 and its external device can be simplified.

Also in the variant of the first embodiment, the initialization of the frame memory 112a can be performed at any timing as long as the initialization can be completed before the decoding process proceeds and the frame memory 112a is first referred to.

The initialization of the frame memory 112a can be carried out not only at the initiation of the decoding process but also when a transmission error or the like of the coded image data 101 occurred.

In this case, to be more specific, the initialization control means 116 according to the variant of the first embodiment is constructed so as to carry out not only the process for deciding the decoding start timing on the basis of a timing when the first code of the coded image data 101 is input but also a process for detecting an error in the coded image data 101 as well as deciding a decoding timing of the error data on the basis of a timing of occurrence of the detected error, to output the initialization control signal 113 to the initialization means 115 before the decoding start timing or the decoding timing of the error data.

In this case, the image decoding apparatus which can prevent a decoded image having undefined pixel values from being displayed not only at the initiation of the decoding but also at the occurrence of a transmission error, and further has a simple interface to the external device can be realized.

In the first embodiment and the variant thereof, the initialization data 114 are the image data which are composed of only predetermined pixel values, while it is not required that the initialization data 114 are always such image data.

For example, when the decoding process is started from a P frame, with respect to macroblocks which have not been subjected to the intra-refresh in the P frame, the influences of the initialization data 114 strongly remain in the decoded image data 107. Therefore, by using such image data that reduce the user's discomfort (feeling of wrongness) such as image data including character information as the initialization data 114, images which reduce the user's discomfort (feeling of wrongness) are displayed as decoded images while many macroblocks which have not been subjected to the intra-refresh are existing in the reference frame.

Figure 13:
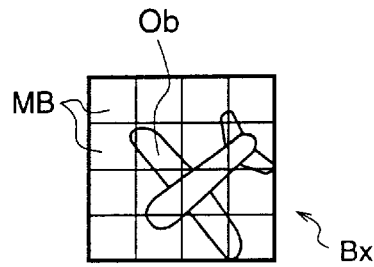
FIG. 13 are schematic diagrams for explaining the non-restrictive motion compensation according to MPEG-4, FIG. 13(a) showing a rectangular region (BBOX), FIG. 13(b) showing a variation of an object in the rectangular region, and FIG. 13(c) showing a reference region outside the reference rectangular region.
Figure 13:
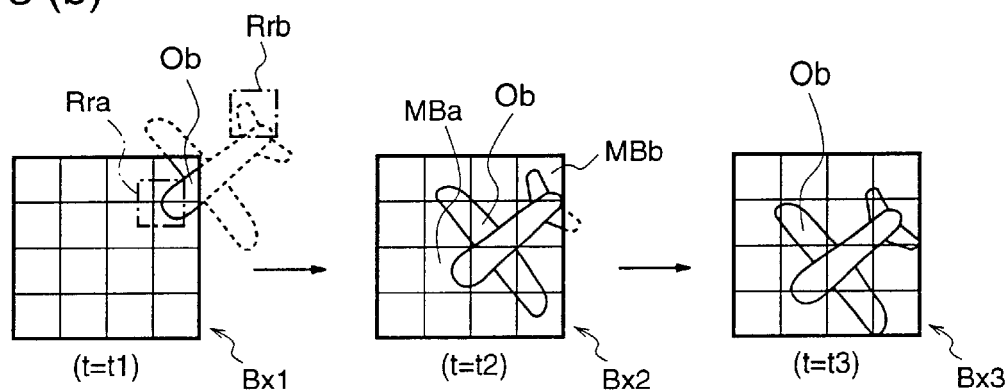
Figure 13:
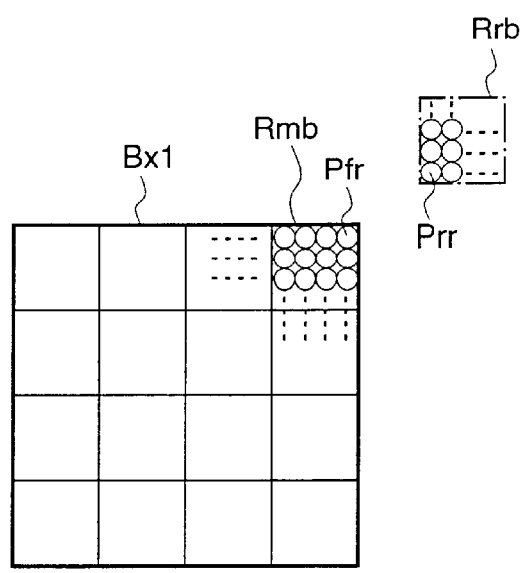
Figure 14:
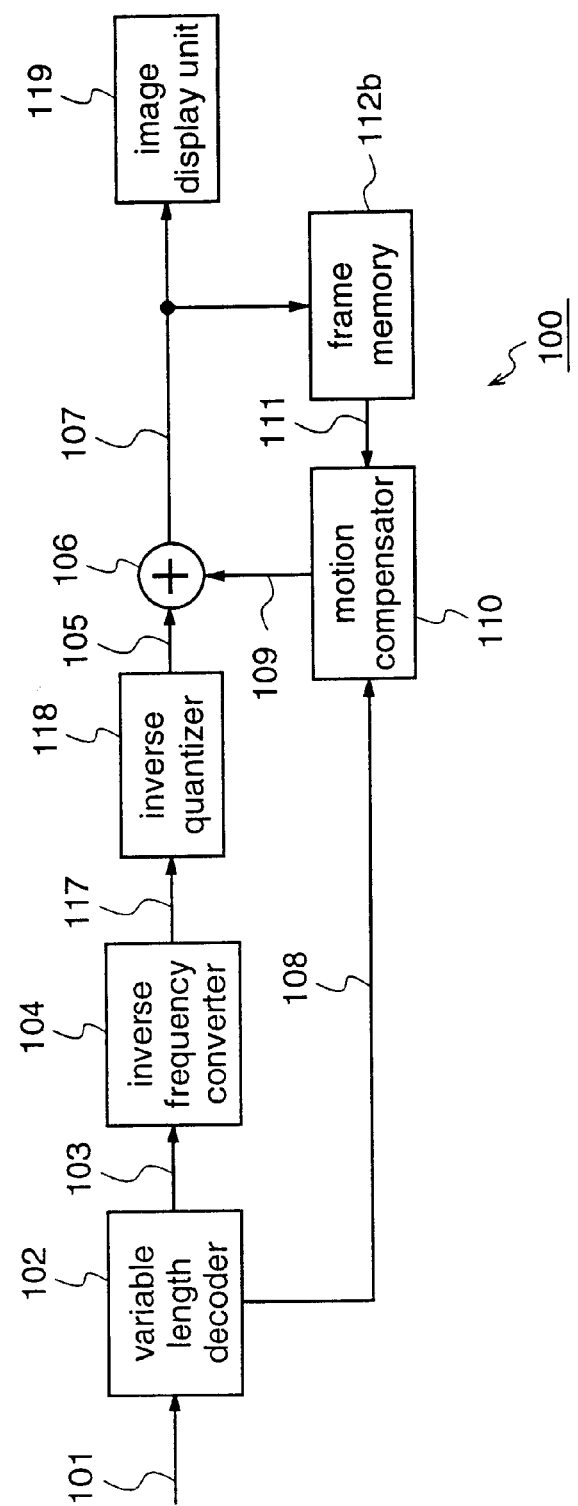
FIG. 14 is a block diagram for explaining a prior art image decoding apparatus.
Figure 15:
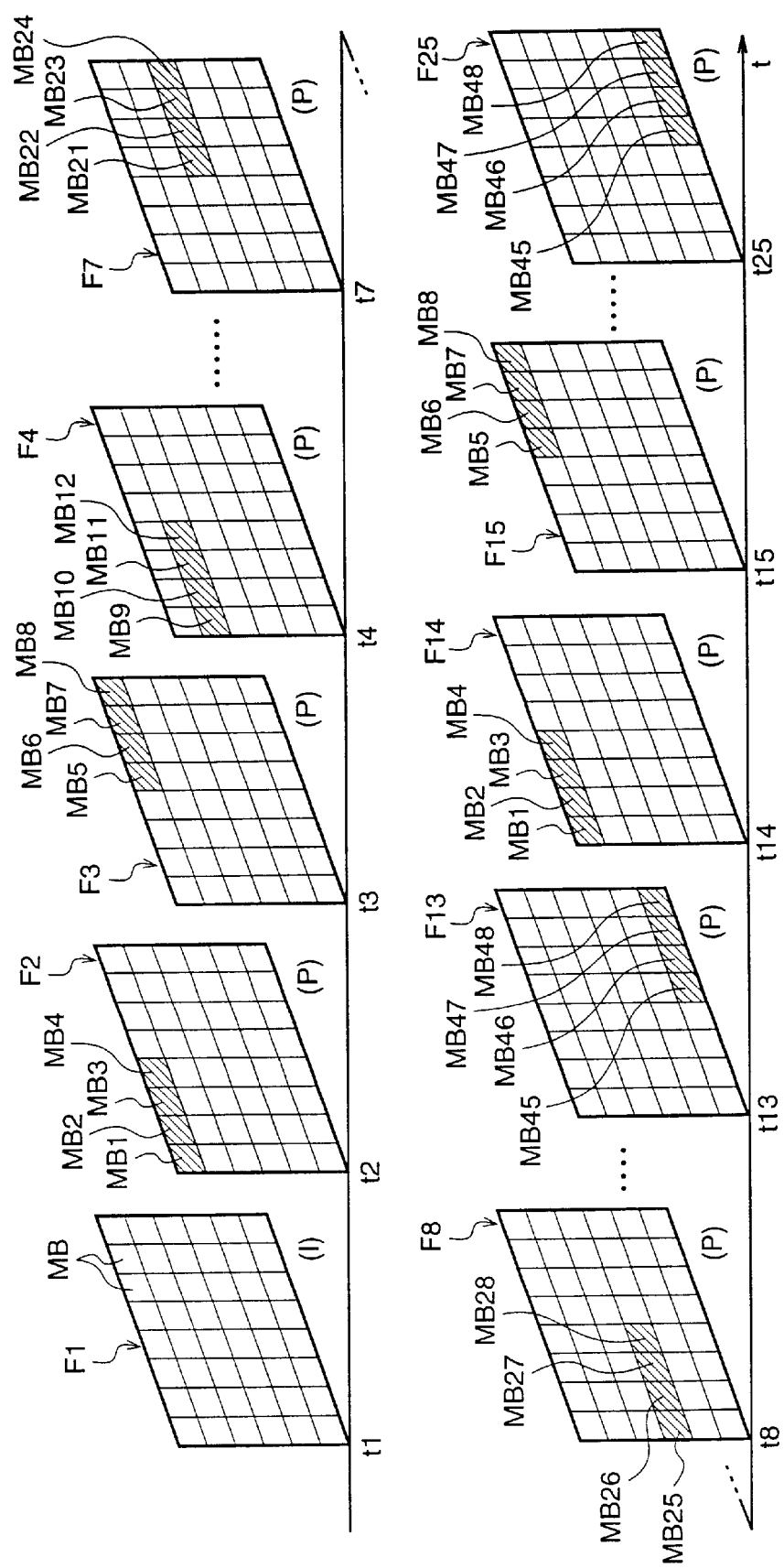
FIG. 15 is a schematic diagram for explaining an intra-refresh process which is used in a decoding process of the prior art image decoding apparatus.

Further, in the decoding process according to MPEG-4 or the like, allowing the motion compensation which designates a pixel outside the reference region as a reference pixel, when the pixel Prr outside the reference region Bx1 is designated as the reference pixel as shown in FIG. 13(c), the pixel Pfr in the reference region is referred to, to carry out the decoding process for coded image data of the target macroblock. As described above, in the decoding process for the target macroblock in which the pixels in the reference region are referred to, not all pixels of the reference region are referred to. Therefore, in the first embodiment and the variant thereof, it is not always required to initialize the entire region in which reference data are recorded in the frame memory 112a.

Figure 5:
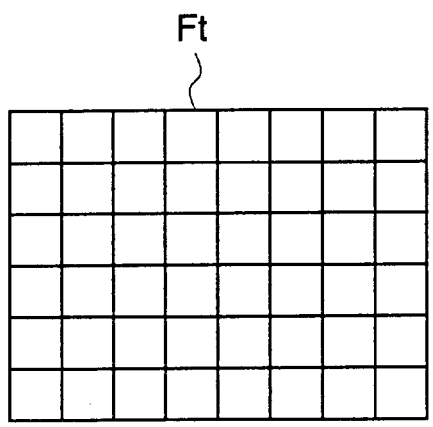
FIG. 5 are schematic diagrams for explaining the operation of the image decoding apparatus according to the variant of the first embodiment of the present invention, FIG. 5(a) showing a processing target frame and FIG. 5(b) showing a reference frame.
Figure 5:
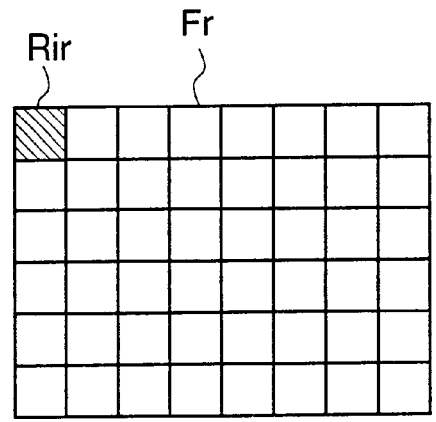

For example, as shown in FIG. 5, it is possible to initialize only image data of a partial region of a reference frame Fr (FIG. 5(b)), for example a region Rir corresponding to one macroblock, and uses the image data of the already initialized region Rir in the reference frame Fr for a processing target frame Fr (FIG. 5(a)) in place of the image data of the entire reference frame Fr.

Consequently, the region to be initialized in the frame memory 112a can be reduced, thereby reducing the amount of data which are processed when the initialization process for the frame memory is carried out.

Further, according to the variant of the first embodiment, when an error such as a transmission error of the coded image data 101 occurred, the initialization control means 116 detects the occurrence of the error, outputs the initialization control signal 113 on the basis of the timing when the detected error occurred, and entirely or partially initializes the reference image data which are stored in the frame memory 112a. However, it is also possible that the initialization control means 116 detects the error occurrence in the coded image data 101 and simultaneously judges the fatality of the error, and outputs the initialization control signal 113 when the error is fatal to initialize the data area in the frame memory 112a, while holding the image data of the reference frame which are stored in the frame memory 112a without performing the initialization when the error is not fatal.

Figure 6:
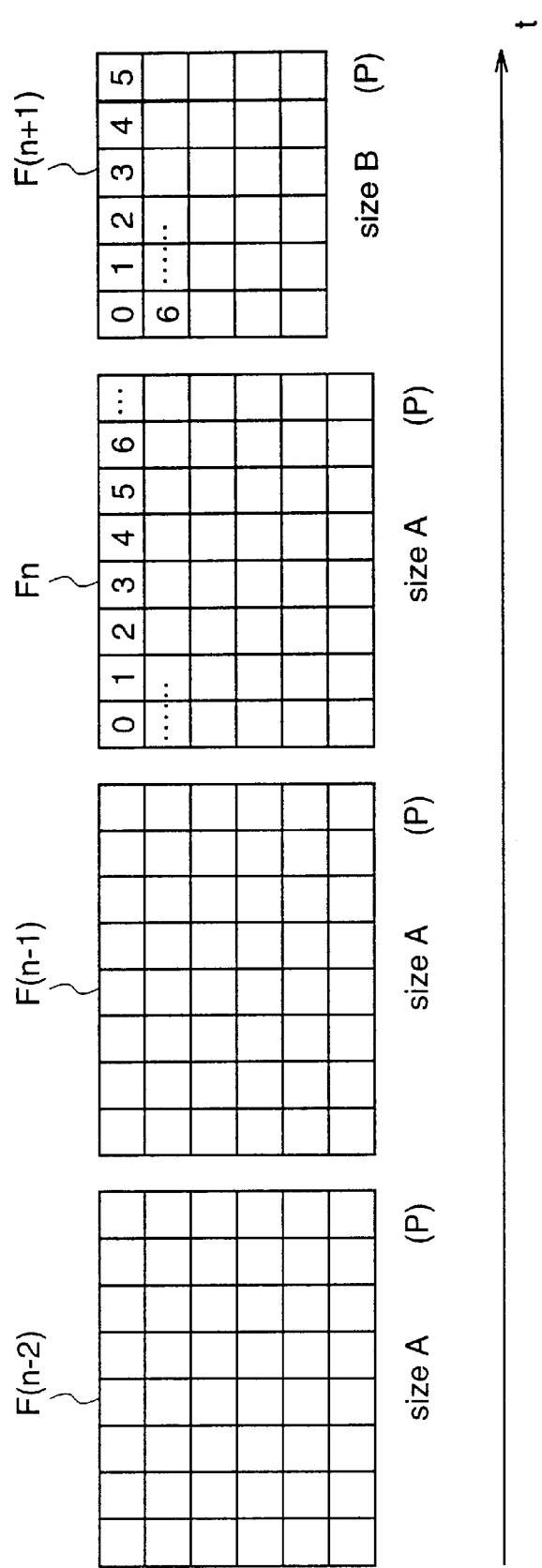
FIG. 6 is a diagram showing an example of a fatal error in the image decoding apparatus according to the variant of the first embodiment.

FIG. 6 is a diagram schematically illustrating a case where an occurring error is fatal.

Figure 7A:
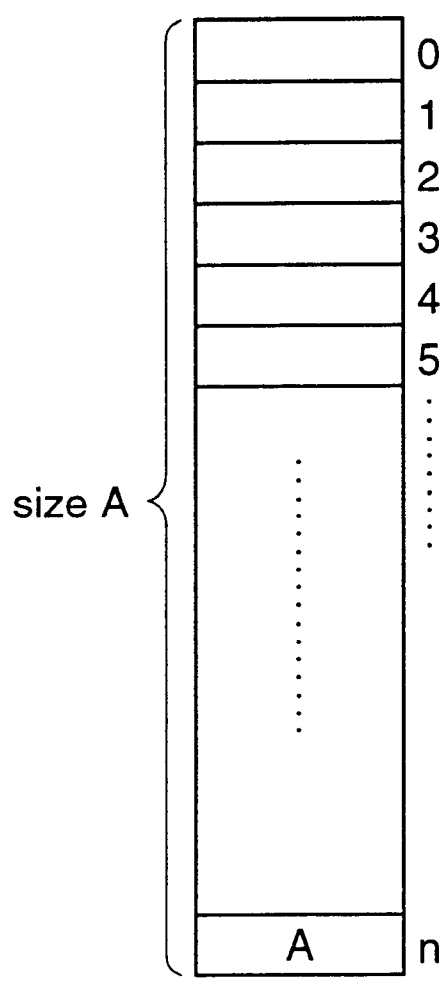
FIG. 7 are diagrams schematically showing a data area in a frame memory in the image decoding apparatus according to the variant of the first embodiment, FIG. 7(a) showing a memory area of a size A and FIG. 7(b) showing a memory area of a size B.
Figure 7B:
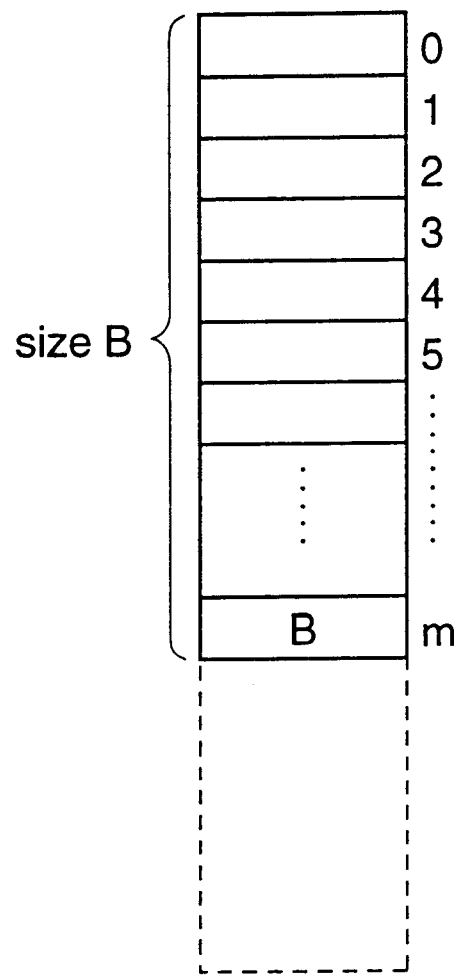

Assume here that H263-standard coded image data 101 are transmitted to the image decoding apparatus 100a1. In the H263 standard, data for determining the size of the image (hereinafter, referred to a source format (SF)) are included for each frame. When an error occurred in the source format, the size of the coded image data 101 which are transmitted is changed, i.e., the image data have initially a size A (frames F(n−2)~Fn) while the size of the image data is changed into a size B (frame F(n+1)), as shown in FIG. 6. In this case, when the frame F(n+1) is a P frame, decoded image data of the frame Fn which is the previous frame are referred to. However, the frame Fn as the previous frame and the frame F(n+1) which is being decoded have different sizes, and further it cannot be judged here how the size is changed from the previous frame Fn to the frame F(n+1), for example, the change in the size results from the reduction in the size of the previous frame Fn or cut-out of a part of the frame Fn. Thus, the correspondence of pixels between the frames Fn and F(n+1) cannot be defined, whereby the image of the processing target frame cannot be predicted from the frame Fn, and further the error recovery cannot be performed either. Therefore, when such a fatal error that the process cannot be uniquely decided from the image data of the previous frame occurred, like in a case where the size of the processing target frame is changed as described above, the initialization control means 116 judges that the error is a fatal error, outputs the initialization control signal 113, and initializes the frame memory 112a in the size B to suppress disturbances in the frame F(n+1). The frame Fn is recognized by the user as an image shown in FIG. 6, while respective pixel values are usually recorded in one-dimensional array in the memory, as shown in FIG. 7, i.e., the frame Fn of the size A is recorded as shown in FIG. 7(a) and the frame F(n+1) of the size B is recorded as shown in FIG. 7(b). Therefore, as described above, when the frame memory 112a is to be initialized in the size B, this can be realized by not accessing the frame memory 112a as far as the region of the size A as shown in FIG. 7(a) but accessing the frame memory 112a only as far as the region of the size B as shown in FIG. 7(b).

On the other hand, when it is judged in the initialization control means 116 that the occurring error is not a fatal error like the above-mentioned one which changes the size of the image data, the initialization control means 116 does not output the initialization control signal 113, holds the image data of the reference frame which are stored in the frame memory 112a, and carries out the error handling process with utilizing the image data.

When the initialization control means 116 detects an error in the coded image data 101 and simultaneously judges the fatality of the error to judge whether the data area in the frame memory 112a are to be initialized or not, in the case of an error having a lower fatality where decoded image data which are stored in the frame memory 112a can be utilized, the image data can be used as the reference image data 111, whereby the number of times of the initialization process for the frame memory 112a can be reduced.

Here, the case where the initialization control means 116 detects an error in coded image data as well as simultaneously judges the fatality of the error is described. However, in a case where the initialization control means 116 is not provided as in the first embodiment, an error detector for detecting an error and judging the fatality of the error is provided in the previous stage of the image decoding apparatus, and the initialization control signal 113 is output from the initialization means 115 when the fatality of the error from the error detector is higher, whereby the same effects as those described above can be obtained.

Embodiment 2

This second embodiment enables to display decoded images without giving discomforts or feelings of wrongness in a case where the decoding process for coded image data which are obtained by the coding process including the intra-refresh is started from a P frame.

Figure 8:
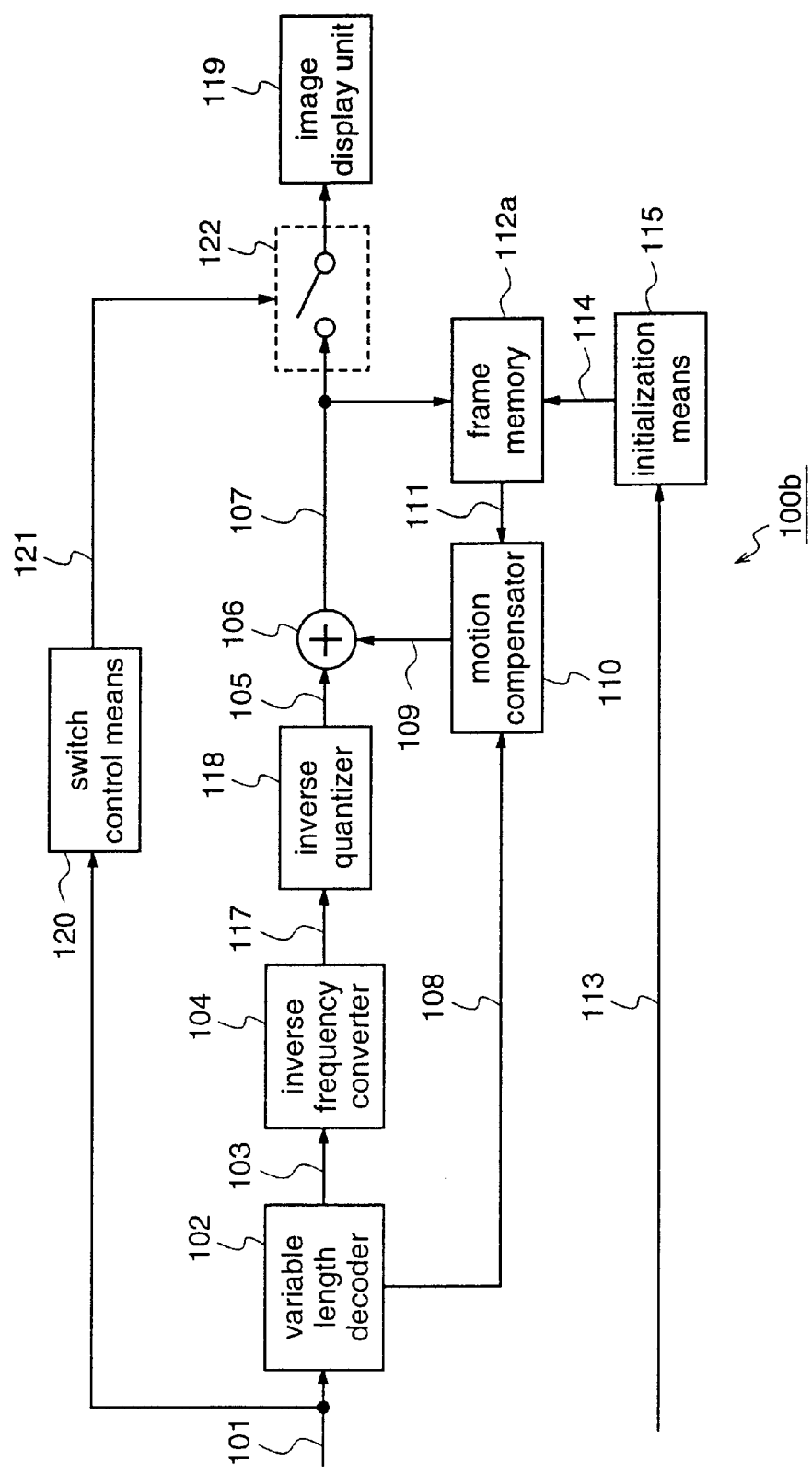
FIG. 8 is a block diagram for explaining an image decoding apparatus according to a second embodiment of the present invention.

FIG. 8 is a block diagram illustrating a structure of an image decoding apparatus according to the second embodiment.

The image decoding apparatus 100b of the second embodiment has, in addition to the elements of the image decoding apparatus 100a of the first embodiment, a switch 122 which is inserted between the adder 106 and the image display unit 119, and a switch control means 120 for controlling the switch 122 to open/close according to situations of the intra-refresh for each macroblock.

The switch control means 120 detects on the basis of input coded image data 101 whether all macroblocks in the processing target frame which is to be decoded have been processed as the intra-macroblocks at least once after the initiation of the decoding process for the coded image data, brings the switch 122 into conduction in accordance with a control signal 121 when all of the macroblocks have been processed as the intra-macroblocks once, and brings the switch 121 out of conduction in accordance with the control signal 121 in other cases.

In addition, the switch control means 120 has a structure for bringing the switch 122 into conduction regardless of the detected result when coded image data corresponding to a predetermined number of frames have been input after the decoding for the coded image data was started.

Other construction in the image decoding apparatus 100b of the second embodiment is identical to that of the image decoding apparatus 100a of the first embodiment.

Next, the operation of the image decoding apparatus is described.

In this second embodiment, like in the first embodiment, when a communication device on which the image decoding apparatus 100b is mounted is powered on, the initialization control signal 113 is supplied to the initialization means 115 of the image decoding apparatus 100b, as well as the decoding process for the input coded image data 101 is started.

In the switch control means 120, it is detected on the basis of input coded image data whether all macroblocks in the processing target frame have been subjected to the intra-frame coding (hereinafter, referred to as an intra coding) at least once after the initiation of the decoding process for the coded image data. Then, according to the detected result, the switch 122 is controlled to open or close by the switch control means 120.

In the frame memory 112a, a process for setting the initialization data 114 which are composed of predetermined pixel values in a storage area of reference image data is carried out by the initialization means 115 to perform an entirely blue or gray screen display.

In this second embodiment, the decoding process for the coded image data 101 is carried out in the same manner as in the first embodiment. To be more specific, the frequency-converted coefficient data 103 and the motion vector data 108 corresponding to respective macroblocks are successively output by the variable length decoding process for the coded image data 101 in the variable length decoder 102.

The frequency-converted coefficient data 103 are converted into differential data by the processes of the inverse frequency converter 104 and the inverse quantizer 118. Further, in the adder 106, the differential data of the target macroblock and predicted image data of the target macroblock are added, and decoded image data corresponding to the target macroblock are output. In the image display unit 119, the display of a decoded image is performed on the basis of the decoded image data. In the frame memory 112a, the decoded image data are written into a part of the data storage area, corresponding to the target macroblock.

At a time when the decoding process for one frame of coded image data has been completed, decoded image data corresponding to the one frame are stored in the frame memory 112a as the reference image data.

Further, in the motion compensation means 110, the predicted image data of the target macroblock are generated on the basis of the reference image data 111 which are stored in the frame memory 112a and the motion vector data of the target macroblock, and the predicted image data are output to the adder 106.

In this decoding process, when a lead frame which is to be decoded (processing target frame) is an I frame, macroblocks at respective positions in the processing target frame have been all subjected to the intra coding, and thus the switch 122 is brought into conduction by the switch control means 120. Therefore, the display of the decoded image is carried out.

When the lead frame which is to be decoded (processing target frame) is a P frame, usually not all macroblocks in the processing target frame are intra-macroblocks which have been subjected to the intra coding, and thus the switch 122 is brought out of conduction by the switch control means 120. Therefore, the display of the decoded image is not carried out.

In the switch control means 120, when it is detected that the coded image data corresponding to the predetermined number of frames have been input after the input of the coded image data of the lead frame was started, the control signal 121 which brings the switch 122 into conduction is output to the switch 122.

When it is detected at a time when coded image data corresponding to plural frames from the lead frame have been input that macroblocks which are at the same positions as those of respective ones of all macroblocks in the processing target frame have appeared as the intra-macroblocks at least once in a series of frames, i.e., from the lead frame to the processing target frame, the switch control means 120 outputs the control signal 121 which brings the switch 122 into conduction to the switch 122.

Hereinafter, with reference to FIG. 9, the process of detecting whether all macroblocks in the processing target frame have been processed as the intra-macroblocks at least once after the decoding process for the coded image data was started is briefly described.

Figure 9:
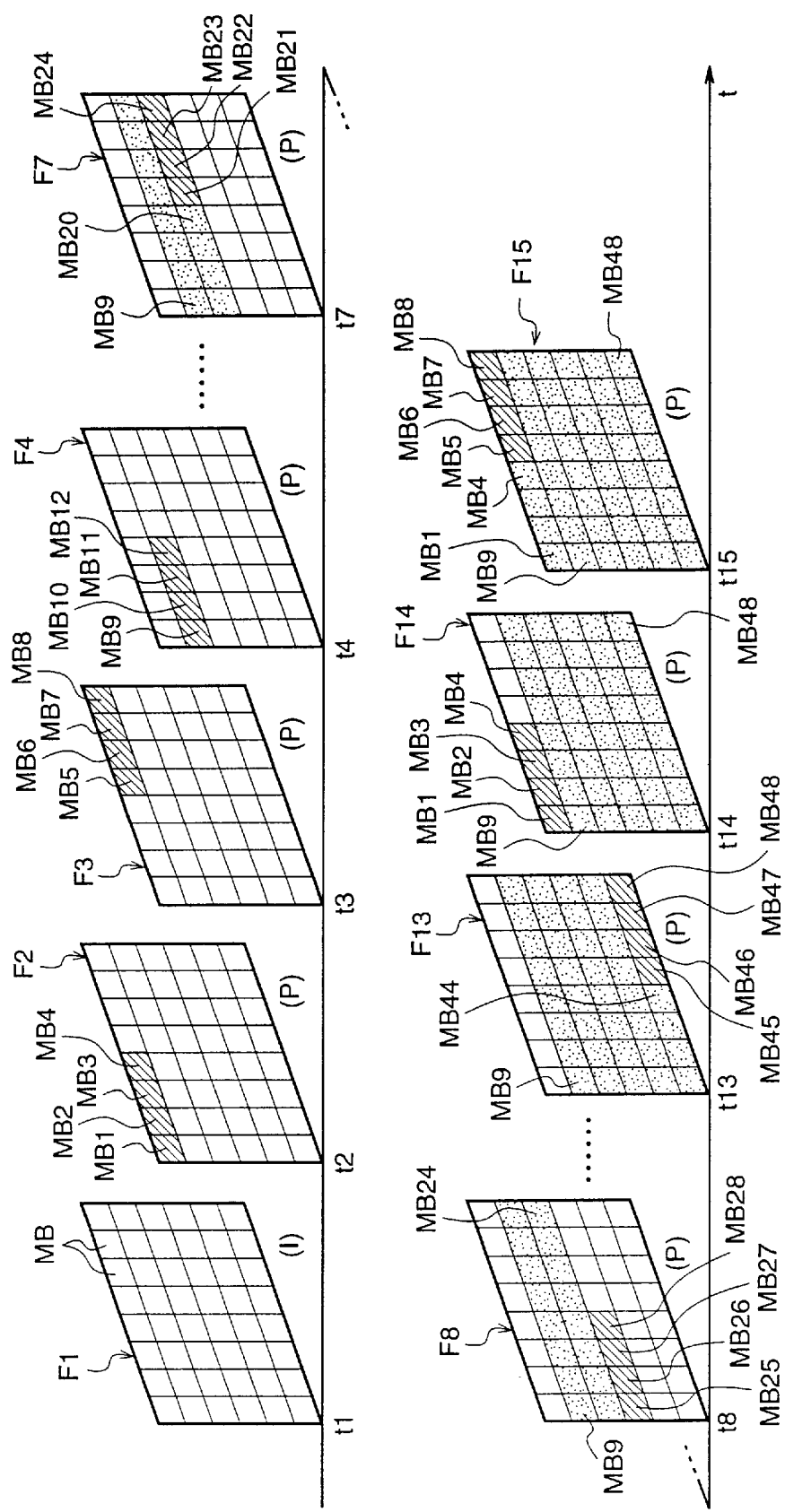
FIG. 9 is a schematic diagram for explaining a process of judging whether all macroblocks in a processing target frame have been processed as the intra-macroblocks in the image decoding apparatus of the second embodiment.

FIG. 9 shows a manner in which the lead frame F1 is coded as an I frame and the following frames F2 to F15 are coded as P frames. Since the intra-refresh is carried out in this coding process, four macroblocks (diagonally shaded areas) are processed in respective P frames, successively as intra-macroblocks.

As a specific control on the switch 122, a case where the decoding process for the coded image data which are obtained by the coding process for image data of the respective frames is started for example from a frame F4, for which the processing time (t=t4) is set will be described.

In the frame F4, macroblocks MB9 to MB12 are made to be intra-macroblocks by the intra-refresh. However, since other macroblocks are inter-macroblocks, this frame is not in a situation where all macroblocks in the processing target frame have been processed as the intra-macroblocks at least once after the decoding process for the coded image data was started. Accordingly, in the decoding process for the frame F4, the switch 122 is brought out of conduction by the control signal 121.

In the frame F7 which is a later frame than the frame F4, macroblocks MB21 to MB24 are made to be intra-macroblocks by the intra-refresh, and macroblocks MB9 to MB20 have been processed as the intra-macroblocks in the frames F4 to F6. However, other macroblocks than these have never been processed as the intra-macroblocks in the frames F4 to F7. Accordingly, in the decoding process for the frame F7, the switch 122 is brought out of conduction by the control signal 121.

Frames F8 to F14 following the frame F7 include macroblocks which have never been processed as the intra-macroblocks since the frame F4.

To be more specific, in the frame F8, macroblocks MB25 to MB28 are made to be the intra-macroblocks by the intra-refresh, and macroblocks MB9 to MB24 have been processed as the intra-macroblocks in the frame F4 to F7, while other macroblocks than these have never been processed as the intra-macroblocks in the frame F4 to F8.

In the frame 13, macroblocks MB45 to MB48 are made to be the intra-macroblocks by the intra-refresh, and the macroblocks MB9 to MB44 have been processed as the intra-macroblocks in the frames F4 to F12, while other macroblocks than these have never been processed as the intra-macroblocks in the frames F4 to F13.

In the frame F14, macroblocks MB1 to MB4 are made to be the intra-macroblocks by the intra-refresh, and the macroblocks MB9 to MB48 have been processed as the intra-macroblocks in the frames F4 to F13, while other macroblocks than these have never been processed as the intra-macroblocks in the frames F4 to F14.

Then, in the frame F15, macroblocks MB5 to MB8 are made to be the intra-macroblocks by the intra-refresh, and the macroblocks MB9 to MB48 and MB1 to MB4 have been processed as the intra-macroblocks in the frames F4 to F14. That is, all macroblocks in the frame F15 have been processed as the intra-macroblocks at least once after the coded image data were input. Thus, in the decoding process for the frame F15, the switch 122 is brought into conduction by the control signal 121.

As described above, in the image decoding apparatus 100b of the second embodiment, when it is detected that all macroblocks in the processing target frame which is to be decoded have been processed as the intra-macroblocks at least once after the input of the coded image data, the image display on the basis of decoded image data is started. Therefore, the decoded image is displayed as soon as pixel values of the decoded image is determined as significant values. To be more specific, it is possible not only to prevent a decoded image having undefined pixel values from being displayed but also to display the decoded image at a time when decoded image data not having undefined pixel values have been generated without waiting for the input of coded image data corresponding to the I frame.

Further, when coded image data corresponding to the predetermined number of frames have been input, display of the decoded image is performed even when there are macroblocks which have not been processed as the intra-macroblocks in the processing target frame. Therefore, with controlling the delay time from when coded image data were input till a decoded image is displayed within a fixed range, the decoded image can be displayed on the basis of complete decoded image data which are composed of only significant pixel values or decoded image data which have few undefined pixel values.

In this second embodiment, the image decoding apparatus comprises the initialization means for initializing the frame memory as in the first embodiment, while the second embodiment does not always require the initialization means.

For example, when it is previously known that input coded image data have been coded by a coding process using the intra-refresh, all macroblocks are surely subjected to the intra coding at least once in a prescribed cycle. Thus, the image decoding apparatus of the second embodiment can have a structure in which the initialization means 115 is omitted (first variant of the second embodiment).

Hereinafter, an image decoding apparatus according to the first variant will be specifically described with reference to the drawings.

Variant 1 of Embodiment 2

Figure 10:
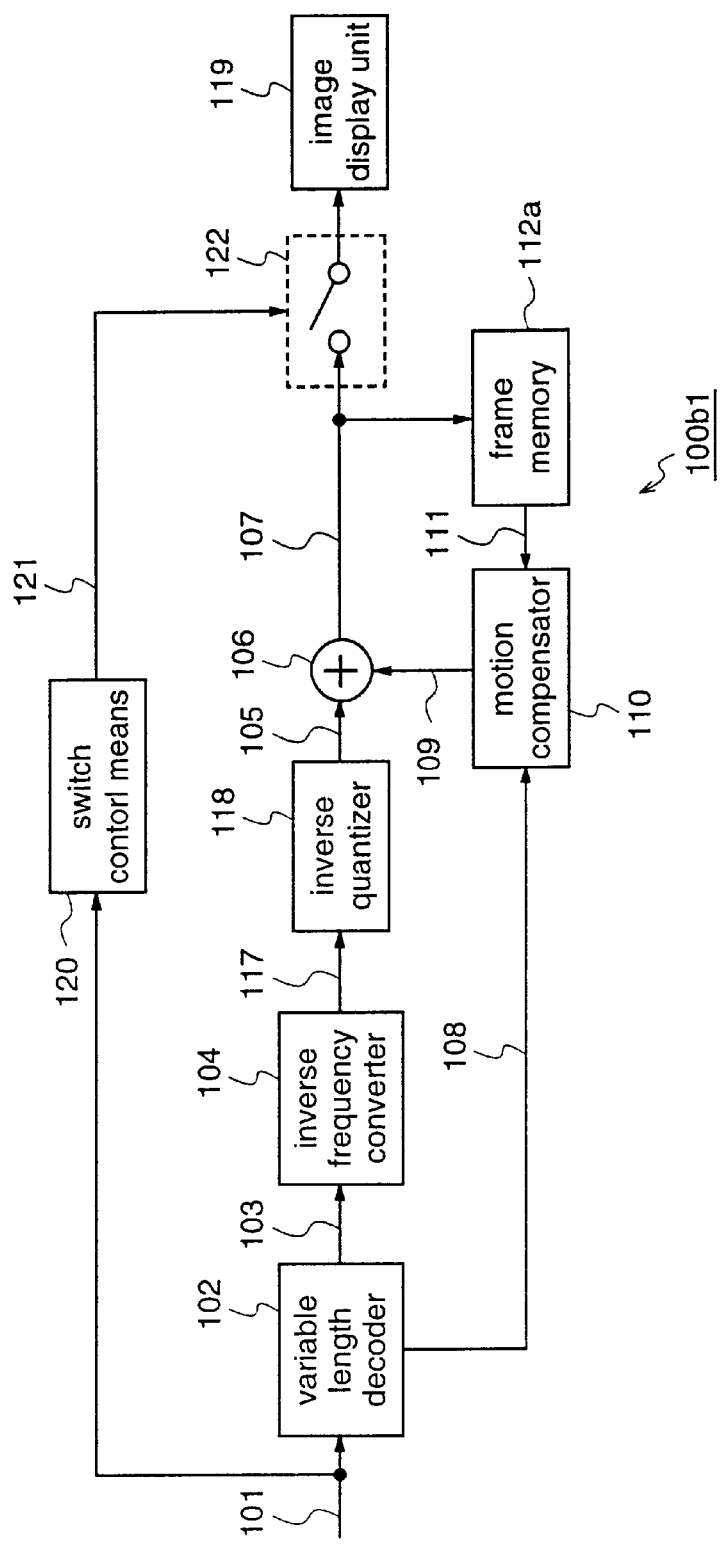
FIG. 10 is a block diagram for explaining an image decoding apparatus according to a first variant of the second embodiment of the present invention.

FIG. 10 illustrates an image decoding apparatus in which the initialization means 115 in the image decoding apparatus according to the second embodiment is omitted, as the first variation of the second embodiment.

This image decoding apparatus according to the first variant of the second embodiment has a structure in which the initialization means 115 in the image decoding apparatus 100b of the second embodiment is omitted.

Here, information about the cycle of the intra-refresh is given in advance to the image decoding apparatus. The switch control means 120 is constructed to output the control signal 121 which turns the switch 122 ON to the switch 122 at a time when the decoding for the number of frames corresponding to the cycle of the intra-refresh has been completed after the input of coded image data.

With this construction, the switch control means 120 outputs the control signal 121 to the switch 122 so as to turn the switch 122 ON at the time when the decoding for the number of frames corresponding to the cycle of the intra-refresh has been completed. Therefore, it is not required to judge whether all macroblocks in the processing target frame have been processed as the intra-macroblocks.

Further, in the second embodiment, the switch 122 is controlled to open or close according to whether all macroblocks in the processing target frame have been processed as the intra-macroblocks after the input of coded image data was started. However, the image decoding apparatus of the second embodiment can have a structure in which the switch 122 is controlled to open or close, even when an error occurred in coded image data, according to whether all macroblocks in the processing target frame have been processed as the intra-macroblocks after the occurrence of the error (second variant of the second embodiment).

Hereinafter, an image decoding apparatus according to the second variant will be specifically described with reference to the drawings.

Variant 2 of Embodiment 2

Figure 11:
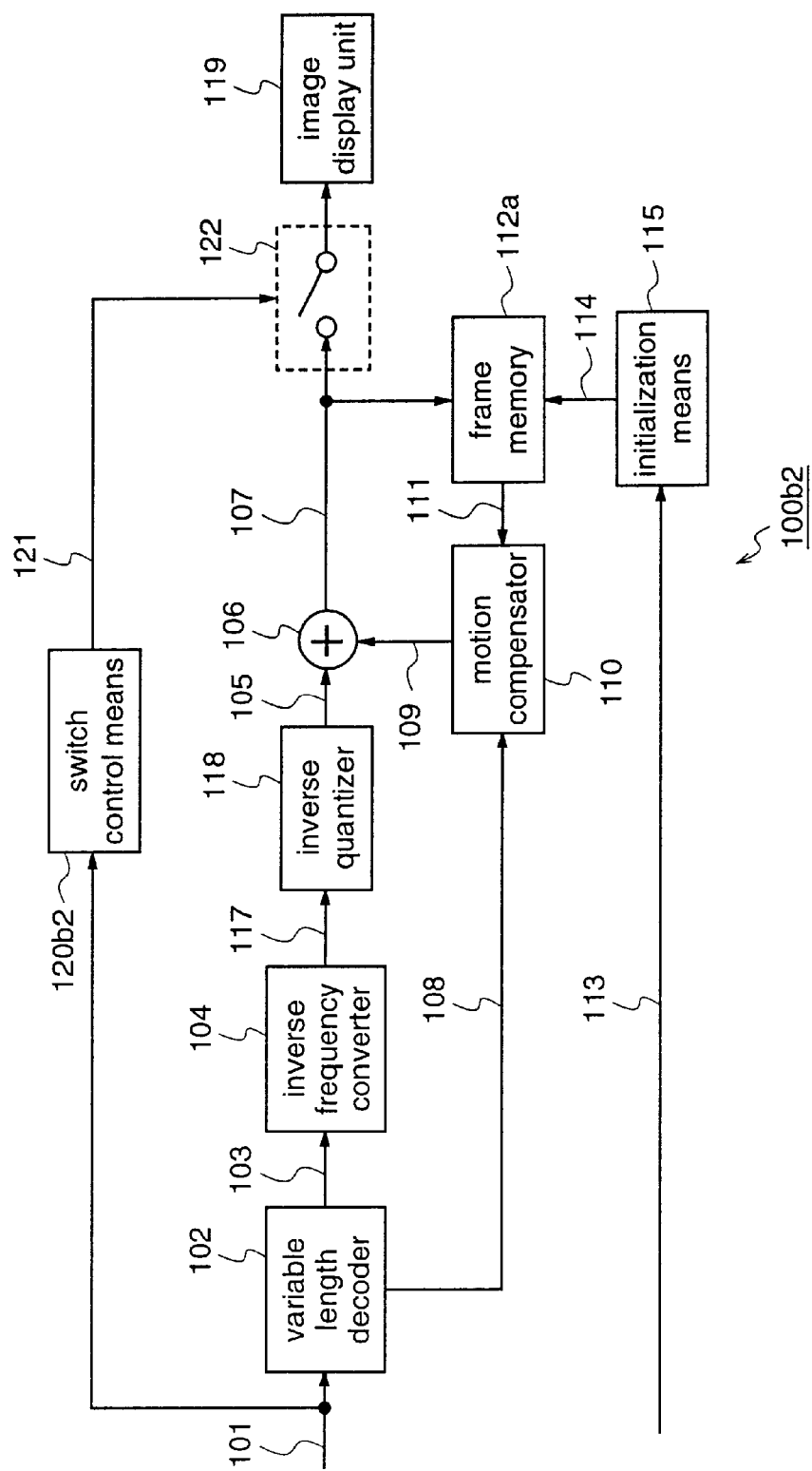
FIG. 11 is a block diagram for explaining an image decoding apparatus according to a second variant of the second embodiment of the present invention.

FIG. 11 is a diagram for explaining an image decoding apparatus having a structure for controlling the switch 122 to open or close also when an error occurred in coded image data, as the second variant of the second embodiment.

The image decoding apparatus 100b according to the second variant of the second embodiment has, in place of the switch control means 120 in the image decoding apparatus 100b of the second embodiment, a switch control means 120b2 for keeping the switch 122 out of conduction until all macroblocks in a processing target frame have been processed as the intra-macroblocks at least once after the input of coded image data was started or after an error occurred in coded image data, and bringing the switch 122 into conduction when all macroblocks in the processing target frame have been processed as the intra-macroblocks at least once.

Further, this switch control means 120b2 enables to display decoded images when coded image data corresponding to a predetermined number of frames have been input not only after the input of the coded image data was started but also after an error occurred when the coded image data were generated, even when there are macroblocks which have not been subjected to the intra coding in a decoding target frame.

In the so-constructed image decoding apparatus 100b2, a process is carried out for detecting that all macroblocks in a processing target frame which is to be decoded have been processed as the intra-macroblocks at least once not only after the input of coded image data was started but also after an error occurred when the coded image data were generated, and an image display on the basis of decoded image data of each frame is started according to the detected result. Therefore, a decoded image having undefined pixel values can be prevented from being displayed after the occurrence of the error in the coded image data. Further, without waiting for input of the coded image data corresponding to an I frame after the error occurred when the coded image data were generated, the decoded image can be displayed at a time when the decoded image data which do not have undefined pixel values have been generated.

When coded image data corresponding to the predetermined number of frames have been input after an error occurred when the coded image data were generated, the display of the decoded image is performed, even when there are macroblocks which have not been subjected to the intra-macroblocks in the decoding target frame. Therefore, the decoded images can be displayed on the basis of complete decoded image data which are composed of only significant pixel values or decoded image data having few undefined pixel values, with controlling the delay time from when an error in the coded image data occurred until a decoded image is displayed within a predetermined range.

Further, when an image decoding program for implementing the image decoding process according to any of the aforementioned embodiments and variants thereof by software is recorded in a data storage medium such as a floppy disk, the image decoding process according to any of the aforementioned embodiments can be easily implemented in an independent computer system.

Figure 12:
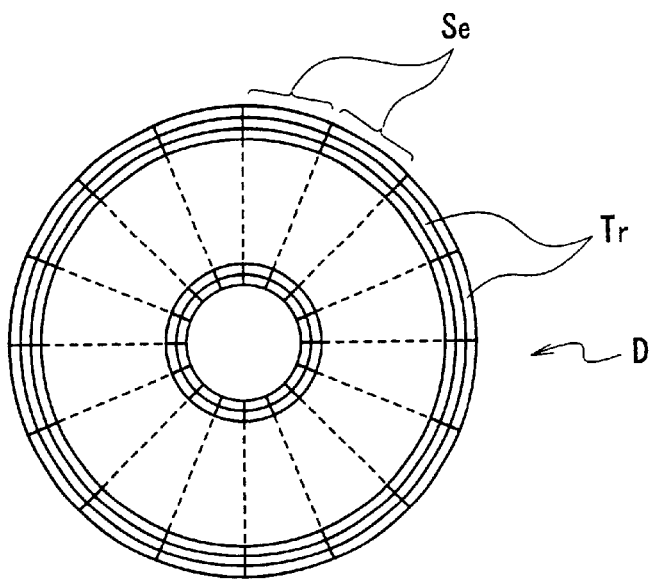
FIG. 12(a) and 12(b) are diagrams for explaining a data storage medium which contains a program for implementing the coding and decoding processes of any of the embodiments by a computer system.
FIG. 12(c) is a diagram for explaining the computer system.
Figure 12:
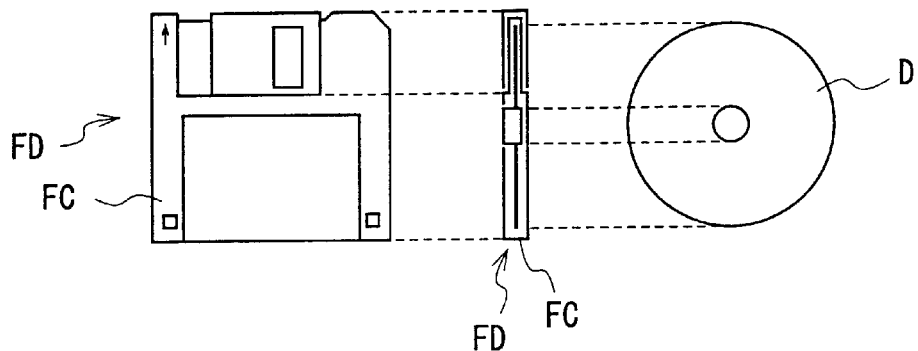
Figure 12:
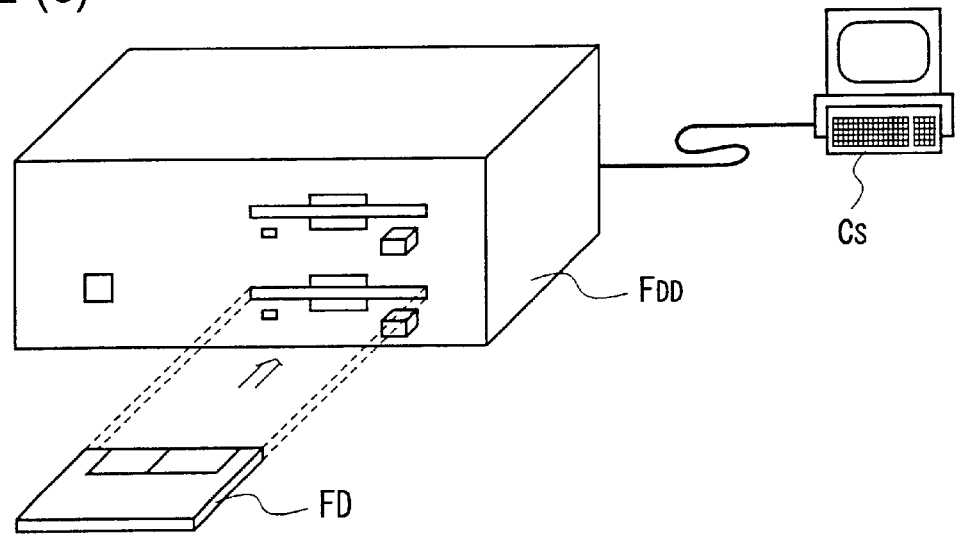

FIGS. 12(a)–12(c) are diagrams for explaining the case where the image decoding process according to any of the aforementioned embodiments and variants there of is executed by a computer system using a floppy disk which contains the image decoding program.

FIG. 12(a) shows a front view of a floppy disk FD, a cross-sectional view thereof, and a floppy disk body D. FIG. 12(b) shows an example of a physical format of the floppy disk body D.

The floppy disk FD is composed of the floppy disk body D and a case FC which contains the floppy disk body D. On the surface of the disk body D, a plurality of tracks, Tr are formed concentrically from the outer circumference of the disk toward the inner circumference. Each track Tr is divided into 16 sectors (Se) in the angular direction. Therefore, in the floppy disk FD containing the above-mentioned program, data of the program are recorded in the assigned sectors Se on the floppy disk body D.

FIG. 12(c) shows the structure for recording the program in the floppy disk FD and performing the image decoding process with software by using the program stored in the floppy disk FD.

To be specific, when the program is recorded in the floppy disk FD, data of the program are written in the floppy disk FD from the computer system Cs through the floppy disk drive FDD. When the above-mentioned image decoding apparatus is constructed in the computer system Cs by the program recorded in the floppy disk FD, the program is read from the floppy disk FD by the floppy disk drive FDD and then loaded to the computer system Cs.

Although in the above description a floppy disk is employed as a data storage medium, an optical disk may be employed. Also in this case, the image decoding process can be performed by software in the same manner as the case of using the floppy disk. The data storage medium is not restricted to the optical disk and floppy disk, and any medium may be employed as long as it can contain the program, for example, an IC card or a ROM cassette. Also when these data storage media are used, the image decoding process by software can be implemented in the same manner as the case of using the floppy disk.

What is claimed is:

1. An image decoding method including a decoding process for decoding coded image data which are obtained by coding image data of each frame for displaying a predetermined image, to generate decoded image data, and a display process for displaying a decoded image on the basis of the decoded image data, wherein said decoding process includes:

an intra-frame decoding process of decoding coded image data of a processing target frame which is to be decoded, without referring to decoded image data of an already processed frame the decoding process of which has been completed; and an inter-frame decoding process of decoding coded image data of a processing target frame which is to be decoded, with referring to decoded image data of an already processed frame the decoding process of which has been completed, and when the decoded image data of the already processed frame as a reference frame which is to be referred to in the decoding of the coded image data of the processing target frame are undefined, said inter-frame decoding process refers to preset image data for displaying a preset image in place of decoded image data of the reference frame.

2. The image decoding method of claim 1 wherein said decoding process comprises:

decoding coded image data which are obtained by subjecting image data of a processing target frame which is to be coded, to an intra-frame coding process of carrying out coding without referring to image data of an already processed frame the coding process of which has been completed, by the intra-frame decoding process; and decoding coded image data which are obtained by subjecting image data of a processing target frame which is to be coded, to an inter-frame coding process for carrying out coding with referring to image data of an already processed frame the coding process of which has been completed, by the inter-frame decoding process, and said inter-frame decoding process refers to the preset image data, when a processing target frame which is to be decoded first is a frame which has been subjected to the inter-frame coding process.

3. The image decoding method of claim 1 wherein an initialization process is carried out for writing the preset image data as initialization data in a storage area of a frame memory which contains the decoded image data of the reference frame, prior to start of the decoding process.

4. The image decoding method of claim 1 wherein an initialization process is carried out for writing the preset image data as initialization data in a storage area of a frame memory which contains the decoded image data of the reference frame prior to start of the decoding process, even when a processing target frame which is to be decoded first is a frame which has been subjected to the intra-frame coding process, and when an error is detected in a region of image data of the frame which has been subjected to the intra-frame coding process, pixel values of image data of a region corresponding to the region in which the error is detected, the image data being stored in a storage area of the frame memory, are displayed in the region in which the error is detected.

5. The image decoding method of claim 1 wherein when an error is detected in the coded image data of the processing target frame, an initialization process is carried out for writing the preset image data as initialization data in a storage area of a frame memory which contains decoded image data of the reference frame, prior to the decoding of the processing target frame in which the error is detected.

6. The image decoding method of claim 1 wherein when an error is detected in the coded image data of the processing target frame, a fatality of the error is judged prior to the decoding of the processing target frame in which the error is detected;

when the fatality of the error is higher, an initialization process is carried out for writing the preset image data as initialization data in a storage area of a frame memory which contains the decoded image data of the reference frame; and when the fatality of the error is lower, the initialization process is not carried out.

7. The image decoding method of claim 1 wherein image data including character information are used as the preset image data.

8. The image decoding method of claim 1 wherein an initialization process is carried out for writing the preset image data as initialization data in part of a storage area of a frame memory which contains the decoded image data of the reference frame prior to start of the decoding process, and decoded image data which are stored in the part of the storage area of the frame memory are used as the decoded image data of the reference frame.

9. The image decoding method of claim 8 wherein the intra-frame coding process and the inter-frame coding process are carried out for the image data of each frame for each unit area in the frame, and a size of an image corresponding to the part of the storage area of the frame memory is the same as a size of the unit area of the coding processes.

10. The image decoding method of claim 1 wherein image data which are composed of predetermined pixel values are used as the preset image data.

11. An image decoding method which includes a decoding process for decoding coded image data which are obtained by subjecting image data of a processing target frame which is to be coded, to one of an intra-frame coding process of carrying out coding without referring to image data of an already processed frame which has been coded and an inter-frame coding process of carrying out coding with referring to the image data of the already processed frame, for each unit area of the processing target frame, to generate decoded image data, and a display process for displaying a decoded image on the basis of the decoded image data, wherein said decoding process includes:

an intra-frame decoding process of decoding coded image data of an intra-frame coded frame being composed of only unit areas which have been subjected to the intra-frame coding process, without referring to decoded image data of an already processed frame the decoding process of which has been completed; and an inter-frame decoding process of decoding coded image data of an inter-frame coded frame including an unit area which has been subjected to the inter-frame coding process, with referring to decoded image data of an already processed frame the decoding process of which has been completed, and starts the intra-frame decoding process or the inter-frame decoding process, regardless of whether a lead frame which is to be decoded is the intra-frame coded frame or the inter-frame coded frame, and when the lead frame is the inter-frame coded frame, said display process starts display of a decoded image from a predetermined frame subsequent to the lead frame on the basis of decoded image data thereof.

12. The image decoding method of claim 11 wherein when a series of inter-frame coding processes for consecutive N (N is a natural number) frames have been completed, said coding process encodes image data of the respective frames such that all unit areas in a processing target frame become areas which have been subjected to the intra-frame coding process at least once during the series of the inter-frame coding process, and when the lead frame is the inter-frame coded frame, said display process starts display of a decoded image from an N-th frame from the lead frame on the basis of decoded image data thereof.

13. The image decoding method of claim 11 wherein when a series of inter-frame coding processes for a predetermined number of consecutive frames have been completed, said coding process encodes image data of the respective frames such that all unit areas in a processing target frame become areas which have been subjected to the intra-frame coding process at least once during the series of the inter-frame coding processes, and when the lead frame is the inter-frame coded frame, said display process detects a specific inter-frame coded frame which is later than the lead frame, all unit areas of which frame are areas which have been subjected to the intra-frame coding process at least once during the series of the inter-frame coding process, and starts display of a decoded image from the specific inter-frame coded frame on the basis of decoded image data thereof.

14. An image decoding apparatus which receives coded image data which are obtained by coding image data of each frame for displaying a predetermined image, and decodes the coded image data to generate decoded image data, comprising:

a decoding unit for carrying out one of an intra-frame decoding process of decoding coded image data of a processing target frame which is to be decoded, without referring to decoded image data of an already processed frame the decoding process of which has been completed, and an inter-frame decoding process of decoding coded image data of a processing target frame which is to be decoded, with referring to decoded image data of an already processed frame the decoding process of which has been completed;

an image display unit for displaying a decoded image on the basis of the decoded image data;

a frame memory for temporarily containing decoded image data of an already processed frame which is referred to in the inter-frame decoding process; and an initialization unit for initializing the frame memory in accordance with an initialization control signal which is give from outside.

15. The image decoding apparatus of claim 14 wherein the initialization control signal is given from outside, when the decoding process is started or when an error is detected in the coded image data.

16. The image decoding apparatus of claim 14 wherein the initialization control signal is given from outside, when the decoding process is started or when an error is detected in the coded image data and a fatality of the detected error is judged higher.

17. The image decoding apparatus of claim 14 comprising:

an initialization control unit for deciding, on the basis of the input timing of the coded image data, a decoding start timing when the decoding process of the coded image data is to be started, and outputting an initialization control signal to the initialization unit prior to the decoding start timing.

18. The image decoding apparatus of claim 17 wherein the initialization control unit detects an error in the coded image data, decides a decoding timing of the coded image data in which the error is detected on the basis of a timing of occurrence of the error, and outputs the initialization control signal to the initialization control unit prior to the decoding timing of the coded image data in which the error is detected.

19. The image decoding apparatus of claim 17 wherein the initialization control unit detects an error in the coded image data, judges a fatality of the error, and decides a decoding timing of the coded image data in which the error is detected on the basis of a timing of occurrence of the error, and when the fatality of the error is higher, outputs the initialization control signal to the initialization unit prior to the decoding timing of the coded image data in which the error is detected, and when the fatality of the error is lower, does not output the initialization control signal to the initialization unit.

20. An image decoding apparatus which decodes coded image data obtained by subjecting image data of a processing target frame which is to be coded, to one of an intra-frame coding process which does not refer to image data of an already processed frame which has been coded, and an inter-frame coding process which refers to the image data of the already processed frame, for each unit area of the processing target frame, to generate decoded image data, comprising:

a decoding unit for decoding coded image data of an intra-frame coded frame being composed of only unit areas which have been subjected to the intra-frame coding process, without referring to decoded image data of an already processed frame the decoding process of which has been completed, as well as decoding coded image data of an inter-frame coded frame including a unit area which has been subjected to the inter-frame coding process, with referring to decoded image data of an already processed frame the decoding process of which has been completed, to output the decoded image data;

an image display unit for displaying a decoded image on the basis of the decoded image data which are output from the decoding unit;

a switch which is provided between the decoding unit and the image display unit; and a switch control unit for deciding, on the basis of the coded image data, a display start timing when display of a decoded image of each frame is started, and controlling the switch to open or close on the basis of the display start timing.

21. A data storage medium which contains an image decoding program for implementing a decoding process for decoding coded image data which are obtained by coding image data of each frame for displaying a predetermined image, to generate decoded image data, and a display process for displaying a decoded image on the basis of the decoded image data, by a computer, wherein said decoding process includes:

an intra-frame decoding process of decoding coded image data of a processing target frame which is to be decoded, without referring to decoded image data of an already processed frame the decoding process of which has been completed; and an inter-frame decoding process of decoding coded image data of a processing target frame which is to be decoded, with referring to decoded image data of an already processed frame the decoding process of which has been completed, and when decoded image data of an already processed frame as a reference frame which is referred to when the coded image data of the processing target frame are decoded are undefined, said inter-frame decoding process refers to preset image data for displaying a preset image, in place of the decoded image data of the reference frame.

22. A data storage medium which contains an image decoding program for implementing a decoding process for decoding coded image data which are obtained by subjecting image data of a processing target frame which is to be coded, to one of an intra-frame coding process of carrying out coding without referring to image data of an already processed frame which have been coded, and an inter-frame coding process of carrying out coding with referring to the image data of the already processed frame, for each unit area of the processing target frame, to generate decoded image data, and a display process for displaying a decoded image on the basis of the decoded image data, by a computer, wherein said decoding process includes:

an intra-frame decoding process of decoding coded image data of an intra-frame coded frame being composed of only unit areas which have been subjected to the intra-frame coding process, without referring to decoded image data of an already processed frame the decoding process of which has been completed; and an inter-frame decoding process of decoding coded image data of an inter-frame coded frame including a unit area which has been subjected to the inter-frame coding process, with referring to decoded image data of an already processed frame the decoding process of which has been completed, starts the intra-frame decoding process or the inter-frame decoding process, regardless of whether a lead frame which is to be decoded is the intra-frame coded frame or the inter-frame coded frame, and when the lead frame is the inter-frame coded frame, said display process starts display of a decoded image from a predetermined frame which is later than the lead frame on the basis of decoded image data thereof.

* * * * *